(12) United States Patent
Karnes

(10) Patent No.: US 9,344,265 B2
(45) Date of Patent: May 17, 2016

(54) NETWORK PACKET TIMING SYNCHRONIZATION FOR VIRTUAL MACHINE HOST SYSTEMS

(71) Applicant: Anue Systems, Inc., Austin, TX (US)

(72) Inventor: Joshua D. Karnes, Cedar Park, TX (US)

(73) Assignee: Anue Systems, Inc., Austin, TX (US)

( * ) Notice: Subject to any disclaimer, the term of this patent is extended or adjusted under 35 U.S.C. 154(b) by 0 days.

(21) Appl. No.: 14/514,999

(22) Filed: Oct. 15, 2014

(65) Prior Publication Data
US 2016/0112182 A1 Apr. 21, 2016

(51) Int. Cl.
| | |
|---|---|
| *H04L 12/46* | (2006.01) |
| *H04L 7/00* | (2006.01) |
| *H04J 3/06* | (2006.01) |

(52) U.S. Cl.
CPC .......... *H04L 7/0008* (2013.01); *H04L 12/4641* (2013.01); *H04J 3/0667* (2013.01); *H04J 3/0682* (2013.01); *H04J 3/0697* (2013.01)

(58) Field of Classification Search
CPC ...... H04J 3/0667; H04J 3/0682; H04J 3/0697
See application file for complete search history.

(56) References Cited

U.S. PATENT DOCUMENTS

| | | | | |
|---|---|---|---|---|
| 8,064,485 | B1* | 11/2011 | Montini | H04J 3/0667 370/503 |
| 8,767,752 | B1 | 7/2014 | Tripathi et al. | |
| 8,789,049 | B2 | 7/2014 | Hutchins et al. | |
| 2010/0254499 | A1* | 10/2010 | Thavisri | H04L 12/66 375/356 |
| 2010/0329125 | A1* | 12/2010 | Roberts | H04J 3/0667 370/241.1 |
| 2011/0299537 | A1 | 12/2011 | Saraiya et al. | |
| 2013/0031294 | A1 | 1/2013 | Feng et al. | |
| 2013/0148503 | A1 | 6/2013 | Hutchison et al. | |
| 2013/0215889 | A1 | 8/2013 | Zheng et al. | |
| 2013/0301425 | A1 | 11/2013 | Udutha et al. | |
| 2014/0181818 | A1 | 6/2014 | Vincent et al. | |
| 2015/0009809 | A1 | 1/2015 | Zhang | |
| 2015/0029853 | A1 | 1/2015 | Raindel et al. | |
| 2015/0146527 | A1 | 5/2015 | Kishore et al. | |
| 2015/0250001 | A1 | 9/2015 | Tan et al. | |

OTHER PUBLICATIONS

Chauhan et al., "Is Doing Clock Synchronization In A VM A Good Idea?", 8 pgs. (2011).

(Continued)

*Primary Examiner* — Ross Varndell
(74) *Attorney, Agent, or Firm* — Egan, Peterman, Enders & Huston LLP.

(57) ABSTRACT

Network timing synchronization for virtual machine (VM) host systems and related methods are disclosed that provide synchronization of master/slave clocks within VM host hardware systems. Master timing messages are sent from the master clocks to slave clocks within VM guest platforms hosted by the VM host hardware system within a virtualization layer, and return slave timing messages are communicated from the VM guest platforms to the master clock. Virtual switches within the virtualization layer use virtual transparent clocks to determine intra-switch delay times for the timing packets traversing the virtual switch. These intra-switch delay times are then communicated to target destinations and used to account for variations in packet transit times through the virtual switch. The VM guest platforms synchronize their timing using the timing messages. The master/slave timing messages can be PTP (Precision Time Protocol) timing messages and/or timing messages based upon some other timing protocol.

17 Claims, 15 Drawing Sheets

(56) References Cited

OTHER PUBLICATIONS

Hirschmann, White Paper, "Precision Clock Synchronization", The Standard IEEE 1588, 20 pgs. (Jul. 2009).

Ridoux et al., "The Case for Feed-Forward Clock Synchronization", 12j pgs. (Feb. 2012).

Cisco Connected Grid Switches System Management Software Configuration Guide, Chapter 5, "Configuring Precision Time Protocol", 16 pgs. (May 2014).

SearchServerVirtualization.com, "Solutions to Five Most Common Problems With Virtualization", 4 pgs. (May 2014).

Eidson, Agilent Technologies, "IEEE-1599 Standard For A Precision Clock Synchronization Protocol for Networked Measurement and Control Systems", A Tutorial, 94 pgs. (Oct. 10, 2005).

Vmware, White Paper, Virtualization Overview, 11 pgs. (2006).

Cisco, "Data Center Fabric With Nanosecond Accuracy-Use IEEE1588 PTP on Nexus 3000 Switches", 13 pgs. (Jun. 2012).

Albedo Telecom, "Synchronization & Mobile Networks", White paper, 15 pgs. (2013).

Patent Application, Karnes, "Methods and Systems for Forwarding Network Packets Within Virtual Machine Host Systems", ANUE:033, U.S. Appl. No. 14/515,043, filed Oct. 15, 2014, 24 pgs.

Patent Application, Karnes, "Methods and Systems for Network Packet Impairment Within Virtual Machine Host Systems", ANUE:034, U.S. Appl. No. 14/515,098, filed Oct. 15, 2014, 20 pgs.

Office Action mailed Dec. 18, 2015, Karnes, "Methods and Systems for Network Packet Impairment Within Virtual Machine Host Systems", ANUE:034, U.S. Appl. No. 14/515,098, filed Oct. 15, 2014, 27 pgs.

\* cited by examiner

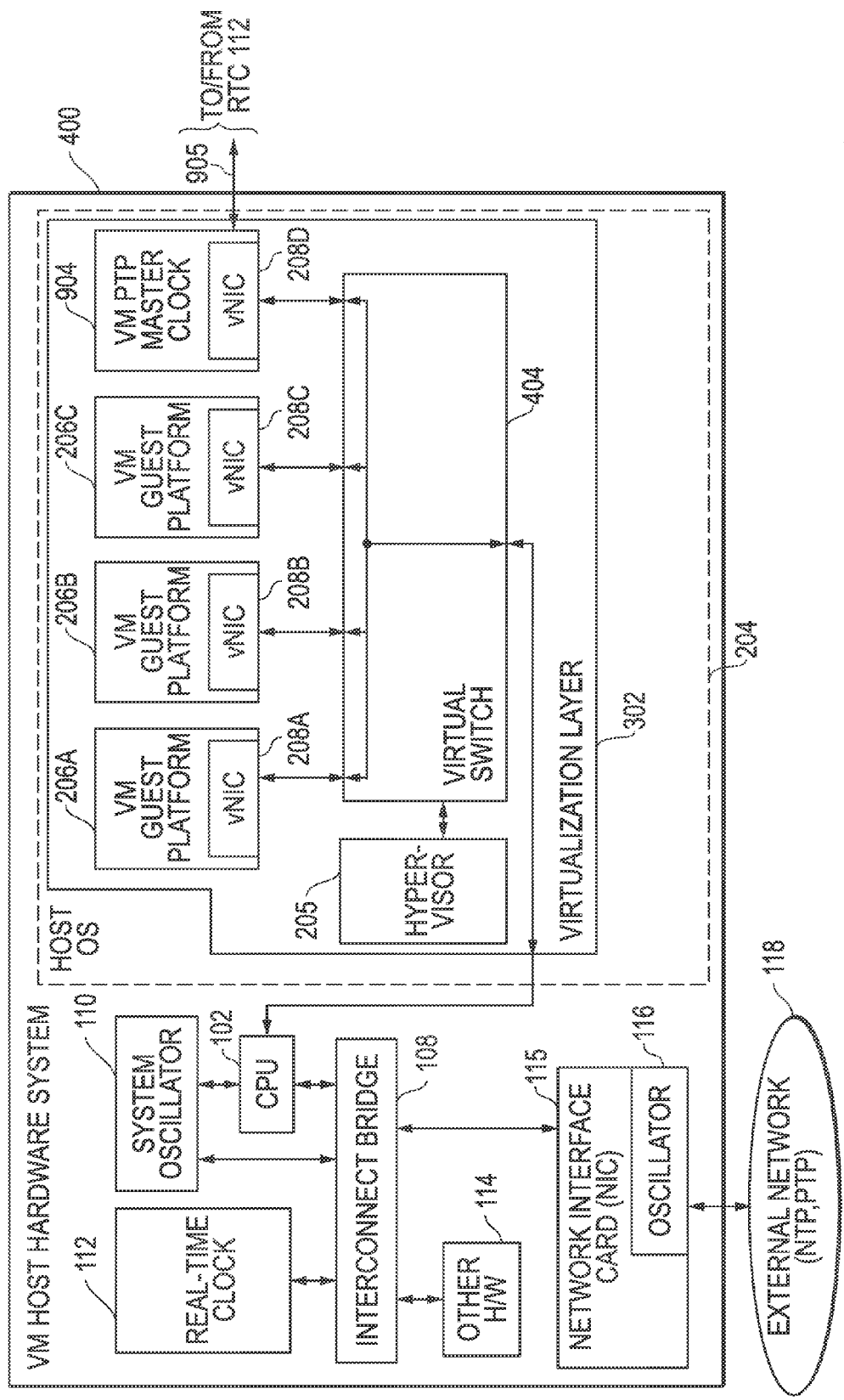

NETWORK PACKET TIMING SYNCHRONIZATION FOR VIRTUAL MACHINE HOST SYSTEMS

TECHNICAL FIELD OF THE INVENTION

This invention relates to network packet communication systems and, more particularly, to timing synchronization for network packets communicated within virtual machine host systems.

BACKGROUND

Network-connected computing systems often utilize network packets for communications within network communication systems. Timing information related to these network packet communications is often useful so that network nodes can synchronize their own operations, synchronize their operations with other network nodes, and/or determine relative time differences between internal or external events. Timing information can be obtained using a variety of techniques. For example, timing protocols can use GPS (Global Positioning System) or other GNSS (Global Navigation Satellite System) timing signals that are determined using GPS or GNSS receivers. Time code communication formats such as TRIG (inter-range instrumentation group) can also be used to transfer timing information with respect to computing systems. Further, packet-based time synchronization techniques can also be used, such as for example, NTP (Network Time Protocol), PTP (Precision Time Protocol), CES (Circuit Emulation Service), SAToP (Structure-agnostic Time-Division-Multiplexing over Packet), and/or other packet-based timing protocols.

Certain network systems that use PTP solutions implement PTP master clocks, PTP slave clocks, PTP transparent clocks, and/or PTP boundary clocks according to the IEEE 1588 standard. In network switches, a PTP transparent clock effectively measures the time a packet takes to traverse the hardware switch. This intra-switch delay time, known as the "residence time," can be added into a time correction field for the PTP packet in question or can be communicated in a follow-up packet in case of two-step clock synchronization communications. Downstream clocks can then account for the exact delays that packets have experienced in traversing intervening hardware switches. This residence time correction is particularly useful for synchronization using PTP packets where time is communicated by adding a precise origin timestamp associated with a master clock when the packet is transmitted. The time at the slave clock is then determined by adding the cumulative delays in correction fields to the origin timestamp contained in the PTP packet. The mechanism of the transparent clock is to perform a measurement of the intra-switch delay time required for a packet to traverse a hardware switch.

FIG. 1A (Prior Art) is a block diagram of an example embodiment for a server system 100 that communicates with an external network 118 using a timing protocol such as NTP (Network Time Protocol) and PTP (Precision Time Protocol). The server system 100 includes a central processing unit (CPU) 102 that runs an operating system 104 and one or more applications 106 that run on top of the operating system 104. The operating system 104 and the applications 106 can be implemented, for example, as computer-readable instructions stored in a non-transitory data storage medium that are accessed and executed by one or more processing devices, such as CPU 102, to perform the functions for the server system 100. An interconnect bridge 108 can also be provided to couple the CPU 102 to additional circuitry and devices within the server system 100. For example, a system oscillator 110, a real-time clock 112, a network interface card (NIC) 115, and other hardware (H/W) 114 can be coupled to the CPU 102 through the interconnect bridge 108. The system oscillator 110 can also have a direct connection to the CPU 102. The NIC 115 can also include an oscillator 116. The real-time clock 112 can be implemented using an integrated circuit including real time clock (RTC) circuitry and non-volatile read only memory (NVRAM) integrated within an integrated circuit (IC).

In operation, the hardware real-time clock (RTC) 112 provides a precise hardware timing reference for the server system 100, and accurate timing for the server system 100 is dependent upon the hardware system oscillator 110 operating at a known and consistent frequency. The operating system (OS) clock for the operating system 104 and thereby for the user applications 106 is set to this hardware RTC 112 only during system boot or start-up for the server system 100. This OS clock is subsequently maintained during operation of the server system 100 based upon ticks or sub-second time intervals counted by the CPU 102 according to the system oscillator 110. The hardware RTC 112 and the OS clock, however, can drift apart due to differences in the oscillation frequency for the system oscillator 110 and the clock frequency for the RTC 112. The operating system 102 can also be configured to set its time to an external reference using a timing protocol such as NTP or PTP. As such, the OS clock is then synchronized periodically to a NTP/PTP reference time over the external network 118. The OS clock is maintained between NTP/PTP updates (e.g., one second or more intervals) based again upon ticks or sub-second time intervals counted by the CPU 102 according to the system oscillator 110. The trigger within the server system 100 to obtain NTP/PTP updates is based on duration of interval time as determined using the OS clock. As such, time drifts can occur between reference time and OS time due to inaccuracy of system oscillator 110 used to count time between NTP/PTP updates.

FIG. 1B (Prior Art) is a process flow diagram of an example embodiment 150 for timing associated with embodiment of FIG. 1A (Prior Art). As described above, the real-time clock (RTC) 112 can be implemented using an integrated circuit including real time clock (RTC) circuitry and non-volatile read only memory (NVRAM). Further, as indicated by block 160, this real-time clock 112 can be configured to keep time continuously and can be powered, for example, by a battery included within a chassis for the server system 100. This real time clock (RTC) 112 is then used to initialize the system time. In block 152, the server system 100 powers up, and the operating system software 104 loads in block 154. In block 156, the system time is set according to the real-time clock (RTC) 112. In addition, the operating system has the CPU count clock ticks based upon the system oscillator 110 to maintain system time, as indicated by block 162 and the arrow from block 162 to block 156. The server system 100 finishes the boot process in block 158. During operation, a determination is also made in block 164 whether NTP/PTP is being used to update system time within the server system 100 to an external network timing source. If "NO," the flow passes back to block 162 where system time is maintained simply by counting ticks or sub-second time intervals of the system oscillator 110. If "YES," then flow passes to block 166 where it determined whether an NTP/PTP update is required. If "NO," then flow again passes back to block 162. If "YES," then flow passes to block 168 where the operating system (OS) clock or system time is refreshed using NTP/PTP to obtain a reference time from an external timing source through the external network 118.

Certain network communication systems include virtualized processing environments, such as virtual machine (VM) platforms hosted by one or more processing devices, to provide processing resources to user processing systems. For example, network cloud resources made available to network-connected systems are often virtualized such that processors or processing cores associated with a server processing platform (e.g., server blade) and/or combinations of such server processing platforms are used to provide software processing instances or virtual machine platforms within cloud server processing systems. A virtual machine (VM) platform is an emulation of a particular processing system that is created within software being executed on a VM host hardware system. By creating VM platforms within a VM host hardware system, the processing resources of that VM host hardware system can be more easily shared among network connected systems that desire to use these processing resources.

FIG. 2A (Prior Art) is a block diagram of an example embodiment for a VM host hardware system 200 that communicates with an external network 118 using a timing protocol such as NTP or PTP. The VM host hardware system 200 can be implemented in a similar fashion as the server system 100 of FIG. 1A (Prior Art) with respect to the CPU 102, the interconnect bridge 108, the RTC 112, other hardware (H/W) 114, and the NIC 115. Further, the VM host hardware system 200 also includes VM host operating system 204 that in part can operate in a similar fashion to the operating system 104 for embodiment 100 of FIG. 1A (Prior Art) with respect to system clock timing.

In contrast with embodiment 100, however, the VM host hardware system 200 includes a hypervisor 205 that executes on top of the VM host operating system (OS) 204. This hypervisor 205 provides a virtualization layer including a plurality of VM platforms 206A, 206B, 206C ... that emulate processing systems and related processing resources, such as the server system 100 depicted in FIG. 1A (Prior Art). As shown with respect to VM platform 206A, therefore, each of the VM platforms 206A, 206B, and 206C have one or more virtual hardware resources associated with it, such as a virtualized network interface card (NIC) 208A, a virtualized CPU 210A, a virtualized real-time clock (RTC) 212A, and/or other virtualized hardware resources. The VM host hardware system 200 makes each of the VM platforms 206A-C available for use by one or more network-connected guest systems through the VM host operating system 204 and the hypervisor 205. It is noted that the hypervisor 205 provides a management and control virtualization interface layer between the VM platforms 206A-C and the guest systems using the processing resources provided by the VM platforms 206A-C. It is further noted that the VM host operating system 204, the hypervisor 204, the VM guests 206A-C, and the virtualized hardware resources 208A/210A/212A can be implemented, for example, as computer-readable instructions stored in a non-transitory data storage medium that are accessed and executed by one or more processing devices, such as the CPU 102, to perform the functions for the VM host hardware platform 200.

In operation, the VM platforms 206A-C rely upon virtualized hardware clocks for timing even though these clocks are virtualized and not actually present. The virtualized CPU 208A, for example, does not operate at consistent speed as its clock speed may vary according to processing load on the software instance providing the VM platform 206A. Further, clock ticks for the virtualized CPU 208A typically have significant variations leading to large timing errors. In addition, NTP/PTP operations for the VM platform 206A will be set to use the operating system time for the VM host hardware system 200 for NTP/PTP updates. As such, large time errors (e.g., 1 second or more) can accumulate between NTP/PTP synchronization update intervals, because the stimulus to update using NTP/PTP is based on counting system oscillator ticks, and these ticks can be slowed dramatically with respect to the VM platform 206A. Because NTP/PTP depends on symmetric and consistent network delays, the high variability for the VM platforms 206A-C reduce accuracy for NTP/PTP. The virtual machine environment, therefore, creates significant inaccuracies with respect to timing synchronization.

FIG. 2B (Prior Art) is a process flow diagram of an example embodiment 250 for timing associated with embodiment of FIG. 2A (Prior Art). As described above, the VM host operating system 204 and hypervisor 205 emulates a virtualized real-time clocks (RTC) 212A based upon the host OS system time along with the VM platform 206A. As indicated by block 260, this virtualized real-time clock 212A is used to initialize the system time. In block 252, the VM platform 206A powers up, and virtualized operating system software loads in block 254. In block 256, the system time for the VM platform 206A is set according to the virtualized real-time clock (RTC) 212A. In addition, the operating system has the virtualized CPU 210A count clock ticks based upon a virtualized system oscillator to maintain system time, as indicated by block 262 and the arrow from block 262 to block 256. The VM platform 206A finishes the boot process in block 258. During operation, a determination is also made in block 264 whether NTP/PTP is being used to update system time within the VM platform 206A. If "NO," the flow passes back to block 262. If "YES," then flow passes to block 266 where it determined whether an NTP/PTP update is required. If "NO," then flow again passes back to block 262. If "YES," then flow passes to block 268 where the virtual operating system (OS) clock or system time is refreshed using NTP/PTP. However, the reference clock for this NTP/PTP update will by the system time for the VM host hardware system 200. As described above, significant errors (e.g., 1 second and above) can be introduced by variations within processing loads for the VM platform 206A between these timing updates and based upon timing errors within the VM host hardware system 200.

FIG. 3A (Prior Art) is a block diagram of an embodiment 300 where a virtual switch 304 has been included along with the hypervisor 205 within a virtualization layer 302. The virtualization layer 302 can provide one or more virtualized hardware components, such as for example virtualized input/output (IO) interfaces, virtualized network interfaces, virtualized CPUs, virtualized storage mediums, and/or other virtualized components. The virtual switch 304 provides virtual network packet forwarding among the VM platforms 206A, 206B, 206C, and 206D that are hosted as guest processes within the host operating system 204. In particular, the virtual switch 304 communicates with the virtualized NICs 208A, 208B, 208C, and 208D for the VM guest platforms 206A, 206B, 206C, and 206D to forward network packets among the VM guest platforms 206A, 206B, 206C, and 206D and between the VM guest platforms 206A, 206B, 206C, and 206D and the external network 118. As an element of the virtualization layer 302, the virtual switch 304 operates using system clock information from the system oscillator 110, as represented by the dashed line between them.

Although the virtual switch 304 expands the applications that can be effectively hosted by the VM host hardware system 300, the operation of the virtual switch 304 causes variable unknown delays for packets traversing the virtual switch 304, as represented by block 306. These variable unknown delays create errors in timing synchronization that cause the VM host hardware system 300 to be unacceptable for timing sensitive applications.

FIG. 3B (Prior Art) is a message diagram of an embodiment 350 for master/slave messages for a timing protocol such as NTP or PTP. The timing messages allow the slave clock 370 to align itself with the master clock 360. Packet exchanges between master 360 and slave 370 provide measurements of the transit delay between the two using timestamps communicated between the two entities. Embodiment 350 provides an example sequence of events and timing messages associated with an exchange of master and slave timing packets between master 360 and slave 370. The events depicted are:

Event A 330: Packet (in PTP this is the Sync_message) is transmitted by master 360 and the time-of-departure 351 is $t_1$.

Event B 332: The packet (Sync_message) arrives at slave 370 that measures the time-of-arrival as $\tau_2$; assuming that the slave time offset from master (ofm) is $\epsilon$, the actual time-of-arrival 352 is $t_2 = \tau_2 + \epsilon$.

Event C 334: Packet (e.g., the PTP message referred to as Delay_request) is transmitted by slave 370 that notes the time-of-departure is $\tau_3$; assuming that the slave time offset from master is $\epsilon$, the actual time-of-departure 353 is $t_3 = \tau_3 + \epsilon$.

Event D 336: The packet (Delay_request) arrives at master 360 that measures time-of-arrival 354 as $t_4$.

Event E 337: Packet (the Delay_response message) is sent from the master 360 towards the slave 370, and the content of the packet contains the time-of-arrival $t_4$ 354 (of the Delay_request at the master).

Event F 338: The packet (Delay_response) arrives at the slave 320. Now the slave clock 370 has four time-of-arrival and time-of-departure values associated with this exchange of packets and these four values allow for time synchronization of the slave clock to the master clock.

Such a two-way exchange of packets can provide information suitable for allowing the slave 370 to align in time with the master 360. It is also noted that one-way exchanges of timing information can also be used. For one-way communications from master 360 to slave 370, the slave 360 can align its clock with the master 370 if the packet contains the time-of-departure 351 from the master ($t_1$) and the slave 370 measures the time-of-arrival ($\tau_2$). For one-way communication from the slave 360 to the master 370, the slave 360 can align its clock with the master 370 if a mechanism is available for the slave 370 to obtain the results of measurements at the master 370 of time-of-arrival at the master ($t_4$).

For two-way exchanges as shown in embodiment 350, there are four measured values that are communicated between the master 360 and slave 370, namely, ($t_1, \tau_2, \tau_3, t_4$). It is noted that such a two-way exchange involves one timing message packet in each direction, and these timing message packets do not have to be consecutive as long as the timestamp information is communicated appropriately. In some instances, the rate at which timing packets are transmitted in the two directions can be different. Denoting by $\Delta_{MS}$ 340 and $\Delta_{SM}$ 344 the transit delays between the master 360 and slave 370 and vice versa, the following equations can be established:

$$t_4 = \tau_3 + \epsilon + \Delta_{SM} \text{ (from Slave to Master packet)}$$

$$t_1 = \tau_2 + \epsilon - \Delta_{MS} \text{ (from Master to Slave packet)} \quad \text{(Eq. 1)}$$

As there are two equations with three unknowns, it is common to assume reciprocity of transit delay between the two devices, thereby reducing the number of unknowns to two and therefore computing the slave time offset ($\epsilon$) from master from (Eq. 2).

$$\varepsilon = \frac{(t_4 + t_1) - (\tau_3 + \tau_2)}{2} = \frac{(t_4 - \tau_3) - (\tau_2 - t_1)}{2} \quad \text{(Eq. 2)}$$

In a virtual environment such as for the VM guest platforms 206A-D in FIG. 3A, however, the transit delays are highly variable due to the operation of the virtualization layer 302 and the virtual switch 304. As such, the estimate of the slave time offset ($\epsilon$) determined by one of the VM guest platforms 206A-D trying to synchronize to a PTP master clock within the external network 118 will potentially have significant time errors from packet to packet depending upon variations within the time-of-transit for each packet through the virtual switch 304.

SUMMARY OF THE INVENTION

Network timing synchronization for virtual machine (VM) host systems and related methods are disclosed that provide synchronization of master/slave clocks within VM host hardware systems. Master timing messages are sent from the master clocks to slave clocks within one or more VM guest platforms hosted by the VM host hardware system within a virtualization layer, and return slave timing messages are communicated from the VM guest platforms to the master clock. Virtual switches within the virtualization layer use virtual transparent clocks to determine intra-switch delay times for the timing packets traversing the virtual switch. These intra-switch delay times are then communicated to target destinations and used to account for variations in packet transit times through the virtual switch. The VM guest platforms synchronize their timing using the timing messages. The master/slave timing messages can be PTP (Precision Time Protocol) timing messages and/or timing messages based upon some other timing protocol. Further, Different features and variations can be implemented, as desired, and related systems and methods can be utilized, as well.

For one embodiment, a method to synchronize timing in a virtual machine host system is disclosed that includes generating real-time clock information using a real-time clock within a virtual machine (VM) host system, operating one or more processing devices within the VM host system to provide at least one virtual machine (VM) platform within a virtualization layer for the VM host system, generating master timing packets using a master clock within the VM hardware server system with the master clock receiving the real-time clock information from the real-time clock, generating slave timing packets using a slave clock within the at least one VM platform, communicating the master timing packets from the master clock to the slave clock and the slave timing packets from the slave clock to the master clock, and synchronizing timing within the VM platform using the timing messages.

In other embodiments, the method also includes forwarding packets between a network interface for the VM host system and one or more virtual network interfaces for the at least one VM platform using a virtual switch within the virtualization layer and forwarding the master and slave timing packets using the virtual switch with the virtualization layer. In additional embodiments, the method can further include operating a transparent clock within the virtual switch to receive real-time clock information from the real-time clock and to determine intra-switch delay times for the master and slave timing packets traversing the virtual switch using the real-time clock information and then communicating the intra-switch delay times to the at least one VM platform. Further, the method can also include utilizing the timing messages and the intra-switch delay times within the at least on VM platform for timing synchronization. Still further, the method can also include generating master timing packets and slave timing packets within the virtual switch in combination with the transparent clock to form a boundary clock within the virtual switch. In other embodiments, the method can includes communicating the intra-switch delay times by at least one of modifying time correction fields within the timing packets using the intra-switch delay times, adding data to the timing packets using the intra-switch delay times, by encapsulating the packets with headers having the intra-switch delay times, or by communicating the intra-switch delay times by forming additional packets with the intra-switch delay times.

In still further embodiments, the method also includes providing the master clock within at least one VM platform within the virtualization layer. In additional embodiments, the method can include master clock within an operating system for the VM host system apart from the virtualization layer. In other embodiments, the method can also include receiving UTC (Coordinated Universal Time) time information within the VM host system and using the UTC time information to generate the real-time clock information for the real-time clock.

For another embodiment, a virtual machine (VM) host system having timing synchronization is disclosed that includes a real-time clock having real-time clock information as an output, a network interface configured to receive packets from an external network, a master clock coupled to receive real-time clock information from the real-time clock and configured to generate master timing packets using the real-time clock information, and one or more processing devices configured to provide a virtualization layer including at least one virtual machine (VM) platform configured to receive the master timing packets, to generate slave timing packets using a slave clock, to send the slave timing packets to the master clock, and to synchronize timing within the at least one VM platform using the timing messages.

In other embodiments, the virtualization layer further includes a virtual switch configured to forward packets between the network interface and one or more virtual network interfaces for the at least one VM platform and to forward the master timing packets and the slave timing packets. In additional embodiments, the virtualization layer further includes a transparent clock within the virtual switch configured to receive real-time clock information from the real-time clock, to determine intra-switch delay times for the timing packets traversing the virtual switch based upon the real-time clock information, and to communicate the intra-switch delay times to the at least one VM platform. Further, the at least one VM platform can further be configured to utilize the timing messages and the intra-switch delay times for timing synchronization. Still further, a master clock and one or more slave clocks can be included within the virtual switch in combination with the transparent clock to form a boundary clock within the virtual switch. In other embodiments, the virtual switch can be further configured to communicate the intra-switch delay times as modifications to time correction fields within the timing packets, as additional data within the timing packets, within encapsulation headers for the timing packets, or within additional packets having the intra-switch delay times.

In further embodiments, the virtual switch can further include a packet interface configured to communicate with the network interface, a virtual packet router, and one or more packet interfaces configured to communicate with the one or more virtual network interfaces for the at least one VM platform. In addition, the transparent clock can be coupled to the packet interfaces for the virtual switch and comprises a residence timer configured to generate the intra-switch delay times for packets received at the packet interfaces. Still further, the packet residence timer can be configured to send time requests to the real-time clock and to receive the real-time clock information from the real-time clock based upon the time requests.

In still further embodiments, the master clock is formed within at least one VM platform within the virtualization layer. In other embodiments, the master clock is formed within an operating system for the VM host system apart from the virtualization layer.

Different and/or additional features, variations, and embodiments can also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

FIGS. 9A-B are block diagrams of example embodiments for a VM host hardware system having one or more PTP master clocks.

DETAILED DESCRIPTION OF THE INVENTION

Figure 1A:
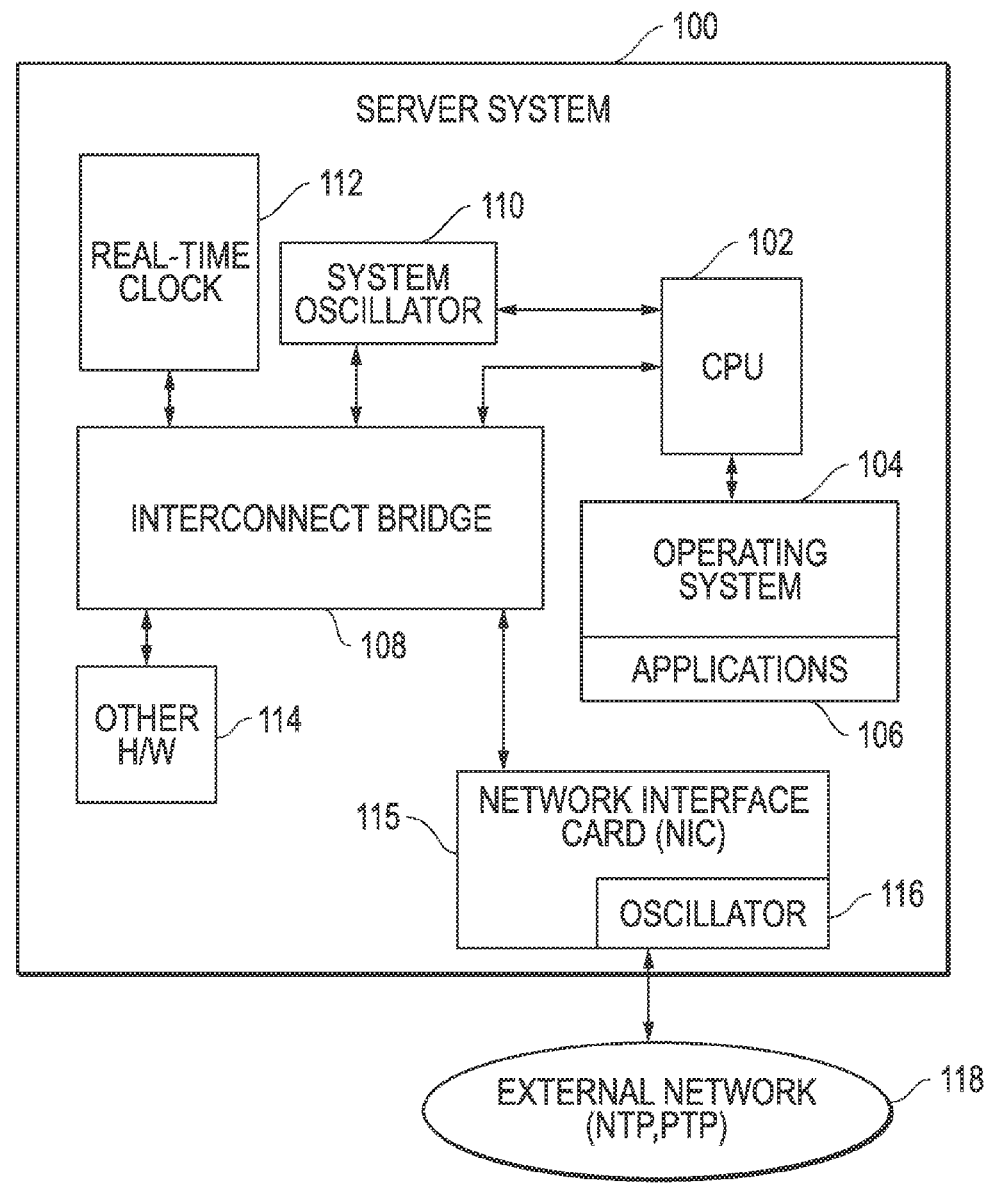
FIG. 1A (Prior Art) is a block diagram of an example embodiment for a server system that communicates with an external network using a timing protocol such as NTP (Network Time Protocol) and PTP (Precision Time Protocol).
Figure 1B:
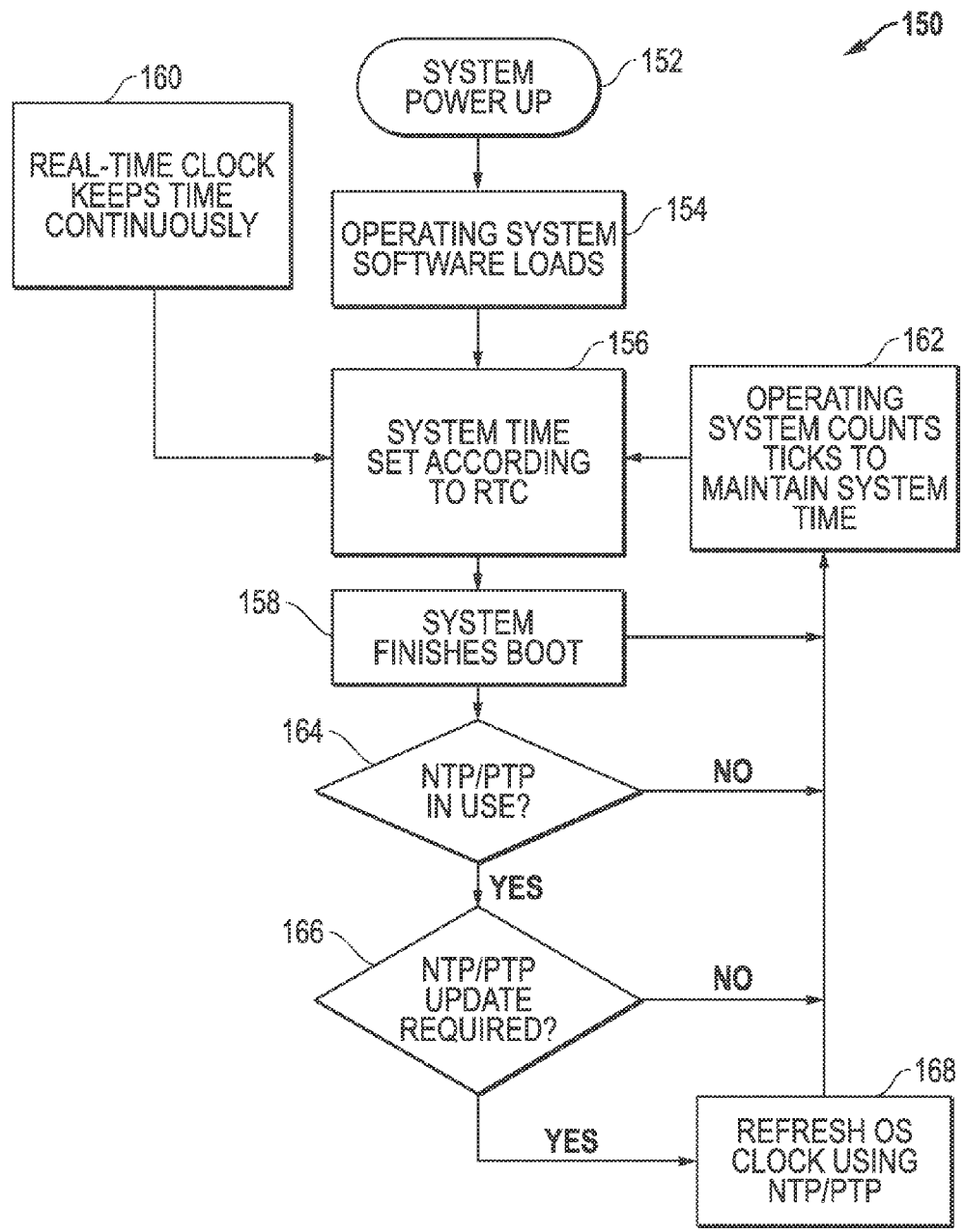
FIG. 1B (Prior Art) is a process flow diagram of an example embodiment for timing associated with embodiment of FIG. 1A (Prior Art).
Figure 2A:
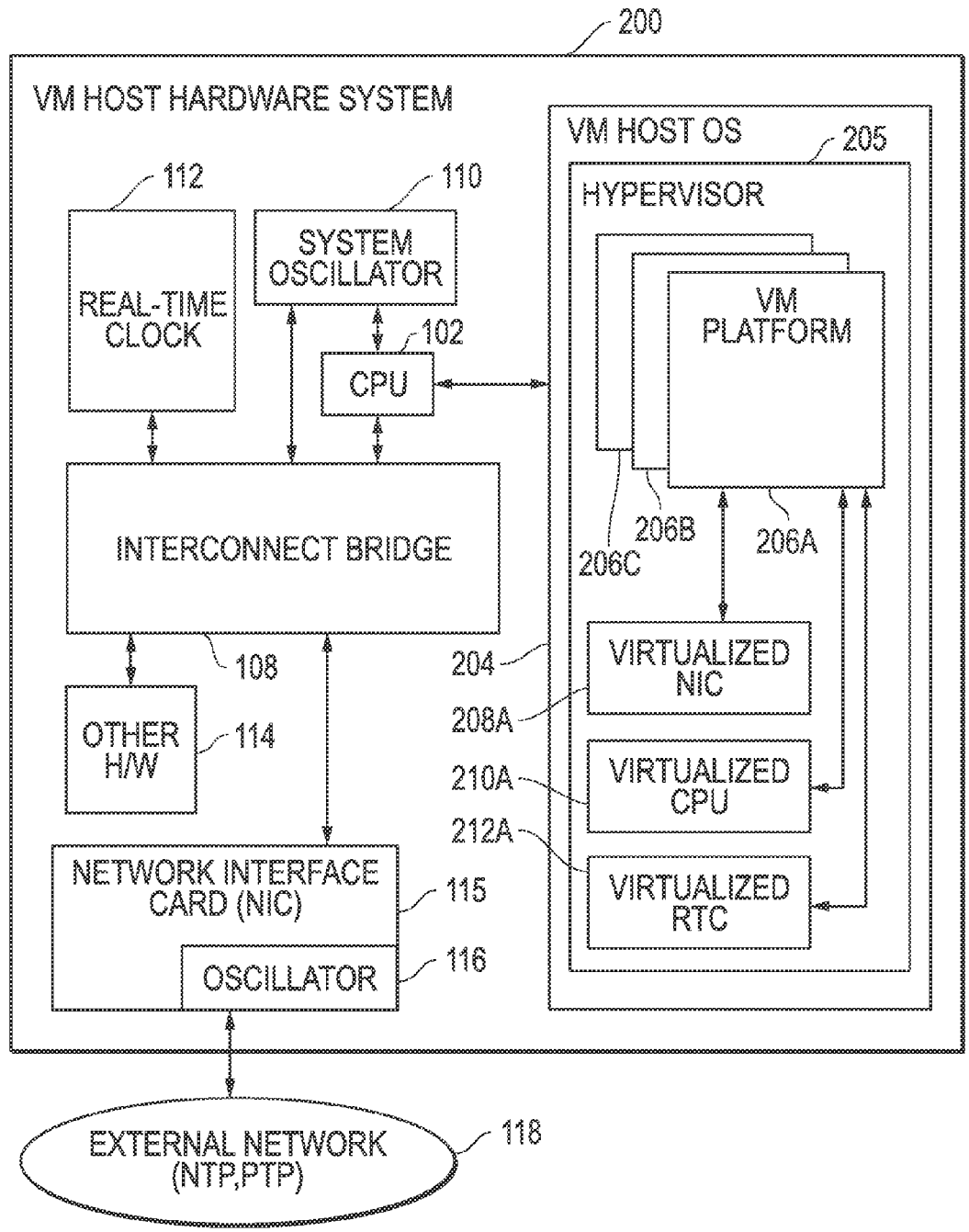
FIG. 2A (Prior Art) is a block diagram of an example embodiment for a virtual machine (VM) host hardware system that communicates with an external network using a timing protocol such as NTP or PTP.
Figure 2B:
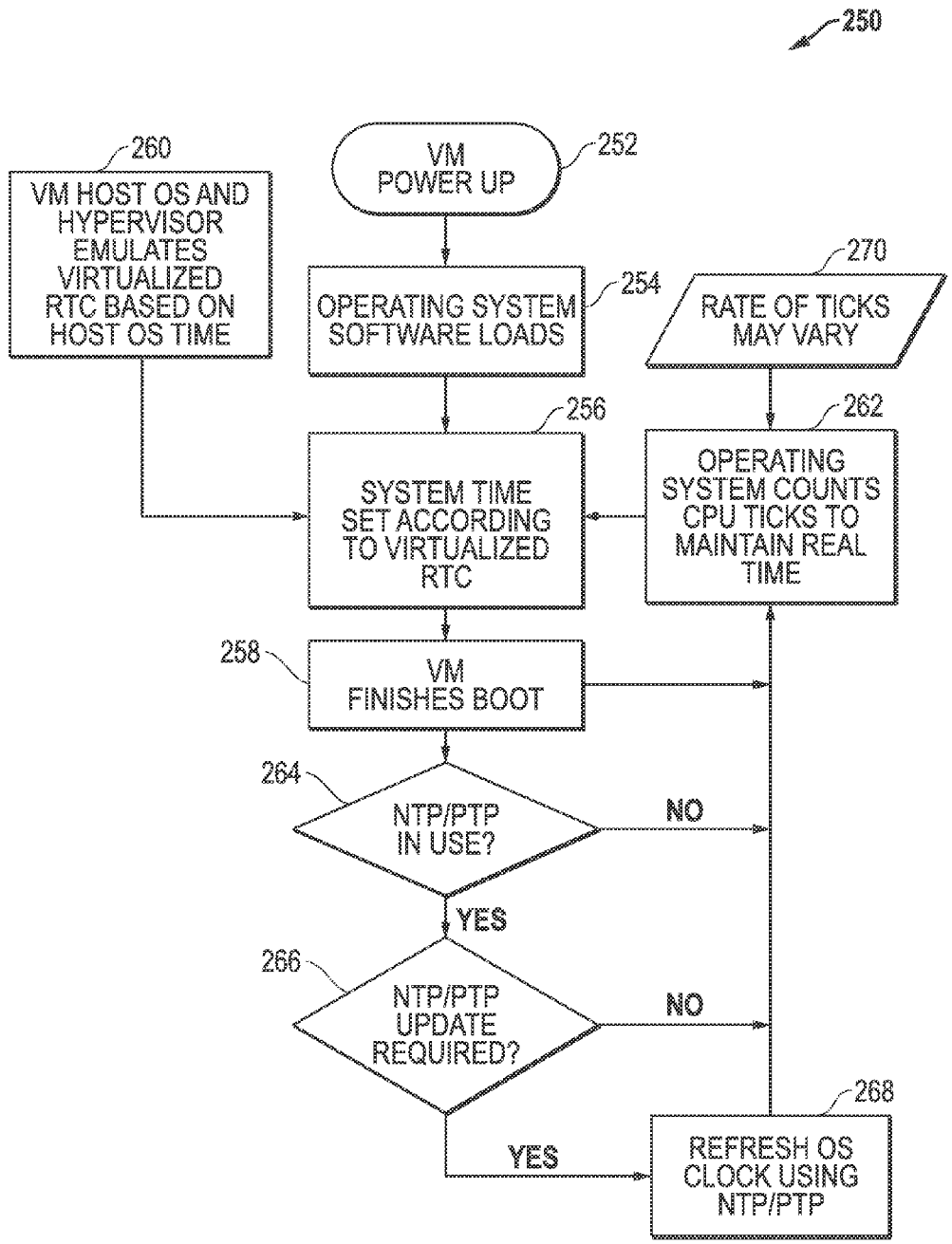
FIG. 2B (Prior Art) is a process flow diagram of an example embodiment for timing associated with embodiment of FIG. 2A (Prior Art).

Network timing synchronization for virtual machine (VM) host systems and related methods are disclosed that provide synchronization of master/slave clocks within VM host hardware systems. Master timing messages are sent from the master clocks to slave clocks within one or more VM guest platforms hosted by the VM host hardware system within a virtualization layer, and return slave timing messages are communicated from the VM guest platforms to the master clock. Virtual switches within the virtualization layer use virtual transparent clocks to determine intra-switch delay times for the timing packets traversing the virtual switch. These intra-switch delay times are then communicated to target destinations and used to account for variations in packet transit times through the virtual switch. The VM guest platforms synchronize their timing using the timing messages. The master/slave timing messages can be PTP (Precision Time Protocol) timing messages and/or timing messages based upon some other timing protocol. Different features and variations can be implemented, as desired, and related systems and methods can be utilized, as well.

As described above, virtual switches for network packets in virtual machine (VM) host hardware systems have non-deterministic delay characteristics, have variable forwarding delays, and do not match the performance of real physical layer network packet switches. The embodiments described herein provide mechanisms for network timing synchronization for VM host systems and in part allow for the integration of PTP (Precision Time Protocol) features within virtual switches, such as PTP master clocks, PTP transparent clocks, PTP boundary clocks, and/or other PTP related features.

In certain embodiments, the PTP master clock or PTP boundary clock, which in part provides a PTP master clock, is based upon hardware real-time clocks (RTCs) within the VM host hardware system. The PTP master clock is then made accessible to VM platforms operating within the VM host hardware system, and the VM platforms use these PTP master clocks for timing synchronization with respect to network packet communications. The VM platforms have PTP slave clocks running that synchronize the clocks for the VM platforms with the master clock. The VM host hardware system may act as the master clock and the VM platforms as the slave clients, or the VM host hardware system and the VM platforms may be slave clients to an external PTP grand master clock. By adding the PTP master clock functionality to the VM host hardware system, the VM platforms are able to synchronize operations with each other and with the host system with sufficient precision to allow for time sensitive applications to run successfully within the VM environment. It is further noted that the VM host hardware system can be synchronized to UTC (Coordinated Universal Time) using PTP, NTP, GPS, IRIG, and/or another timing synchronization protocol. Further, the VM host hardware system can be un-synchronized to UTC and simply provide a free-running PTP master clock.

In further embodiments, the PTP transparent clock or the PTP boundary clock, which in part provides a PTP transparent clock, determines intra-switch packet delays for packets traversing a virtual switch within the VM environment, and these intra-switch delay times are communicated along with the packets with the VM environment. By adding virtual transparent clocks to virtual switches within a VM environment, the disclosed embodiments effectively account for the variable and unknown delays caused virtual switches within the VM environment. Accounting for this delay within the VM environment is important to allow timing sensitive applications to operate successfully within a VM host hardware system. For example, if the VM host hardware system employs a PTP master clock and the VM platforms each have a slave clock in their virtual network device, synchronization to the host time can be greatly improved when the virtual switch has PTP transparent clock functionality. This virtual transparent clock functionality provides improved PTP synchronization testing and/or visibility for VM environments and also allows for real-time synchronization to be performed in the VM environment thereby enabling applications in a VM and server cloud environment that have been previously ruled out for virtualization due to timing sensitivity.

Figure 6A:
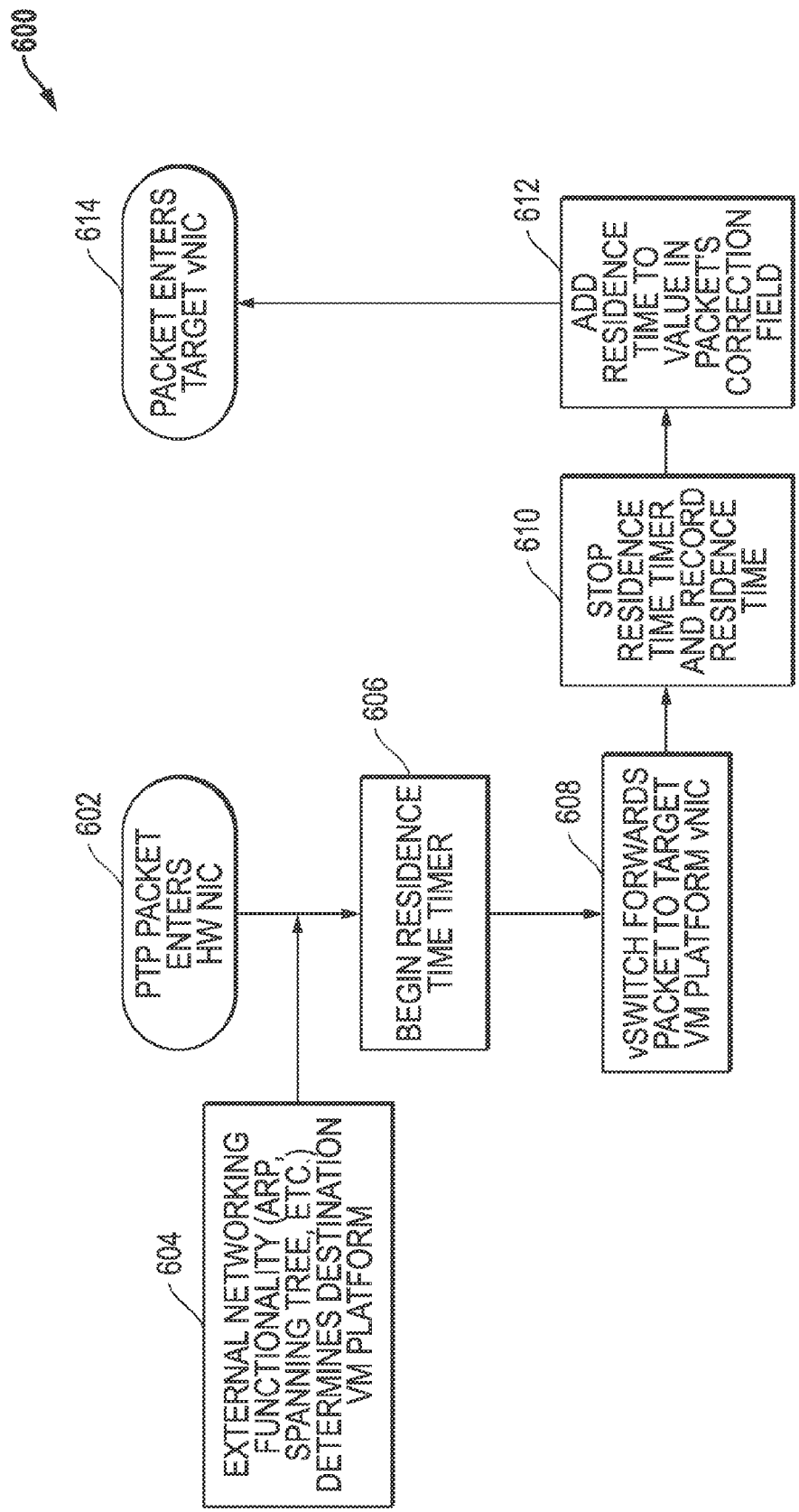
FIG. 6A provides a process flow diagram of an embodiment for a packet residence timer as a PTP packet traverses the virtual switch from a hardware NIC to a virtual NIC.
Figure 6D:
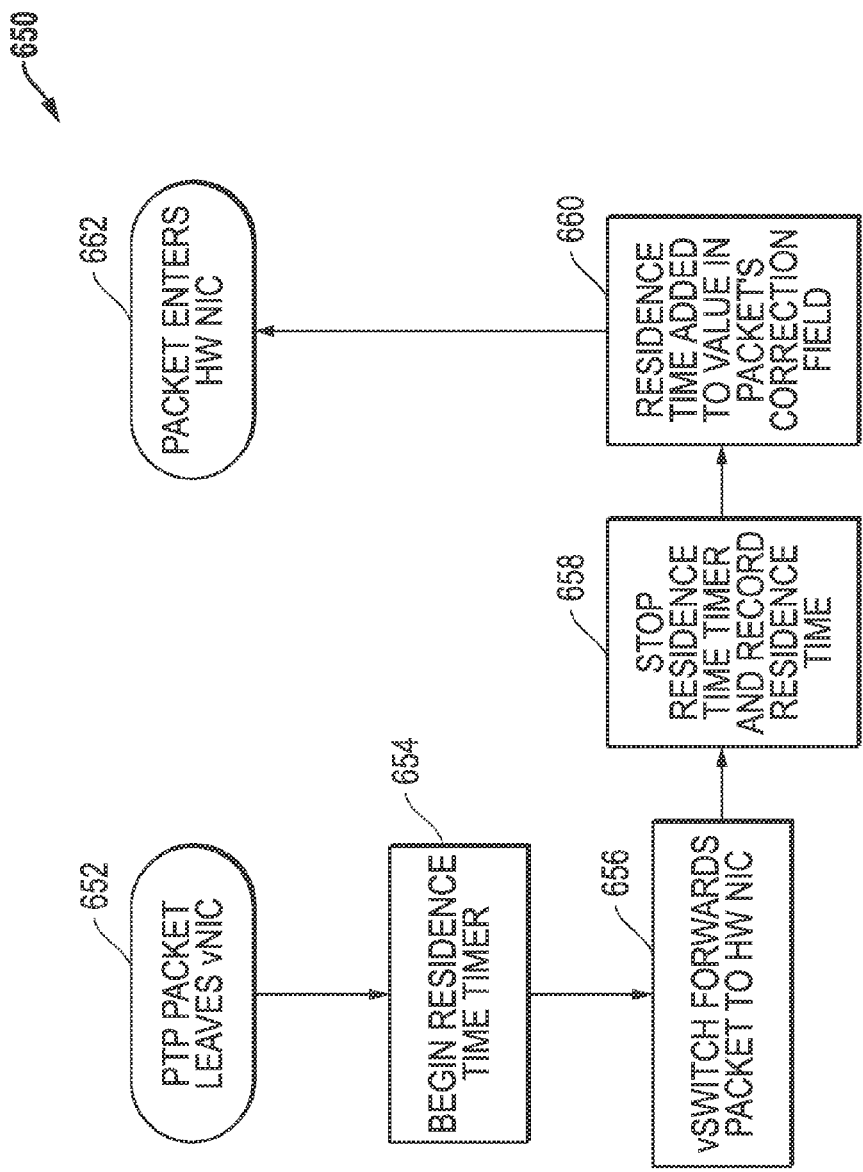
FIG. 6B provides a process flow diagram of an embodiment for a packet residence timer as a PTP packet traverses the virtual switch from a virtual NIC to a hardware NIC.
Figure 7:
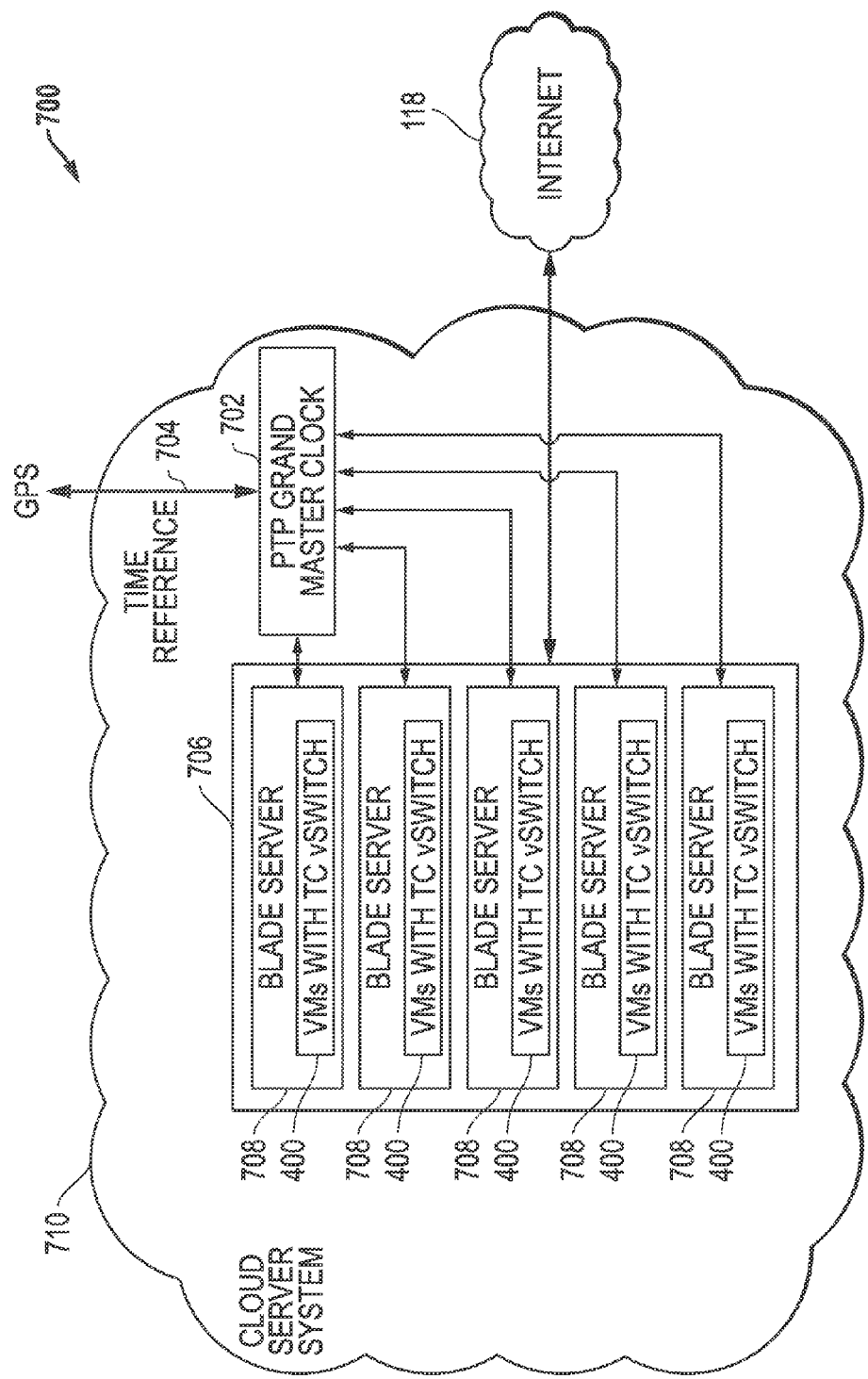
FIG. 7 is a block diagram of an embodiment for a cloud server environment utilizing blade servers having virtual switches with transparent clocks for timing synchronization.
Figure 8:
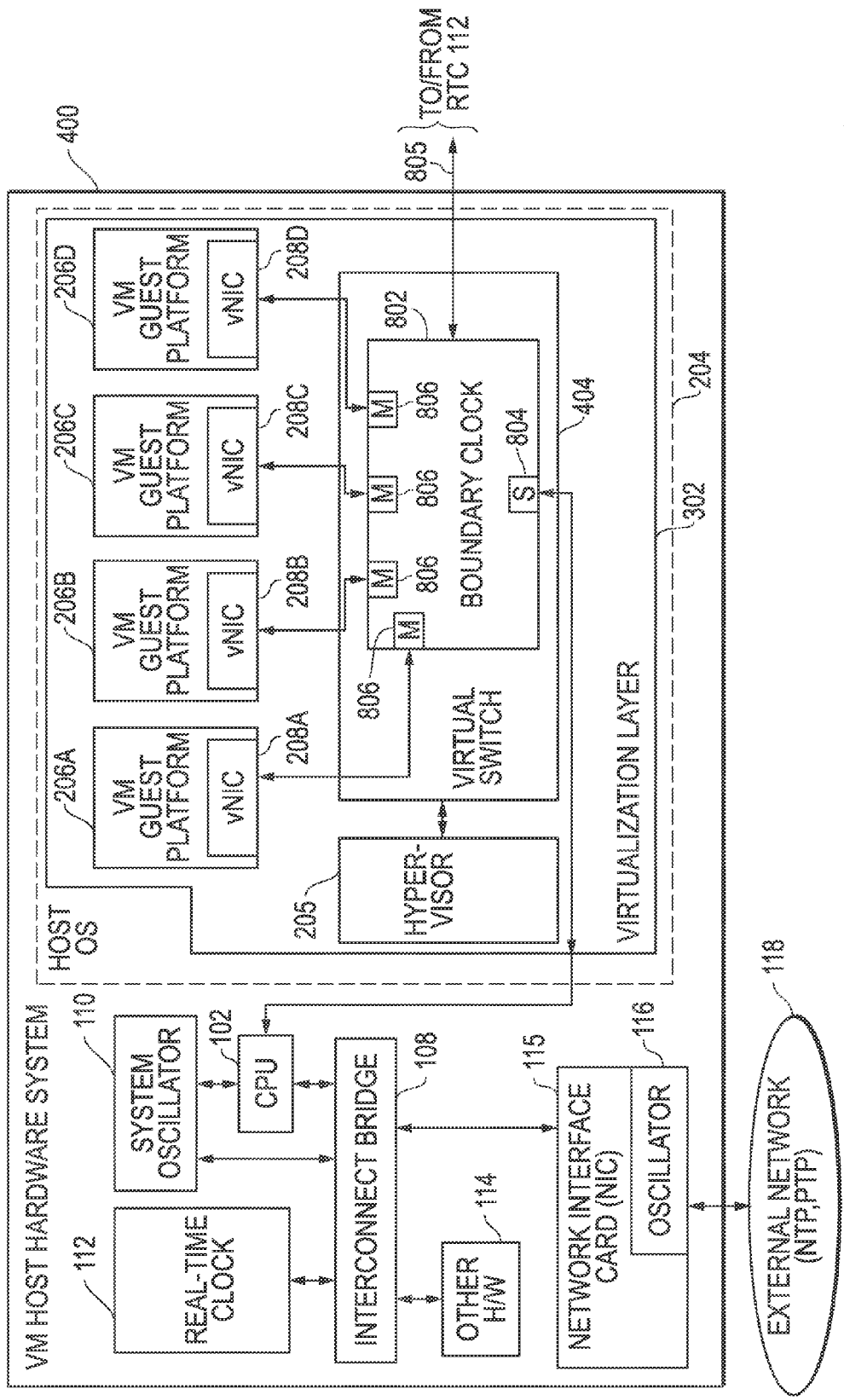
FIG. 8 is a block diagram of an example embodiment for a VM host system having a PTP boundary clock configured to provide PTP master/slave clock functionality within the virtual switch.
Figure 9A:
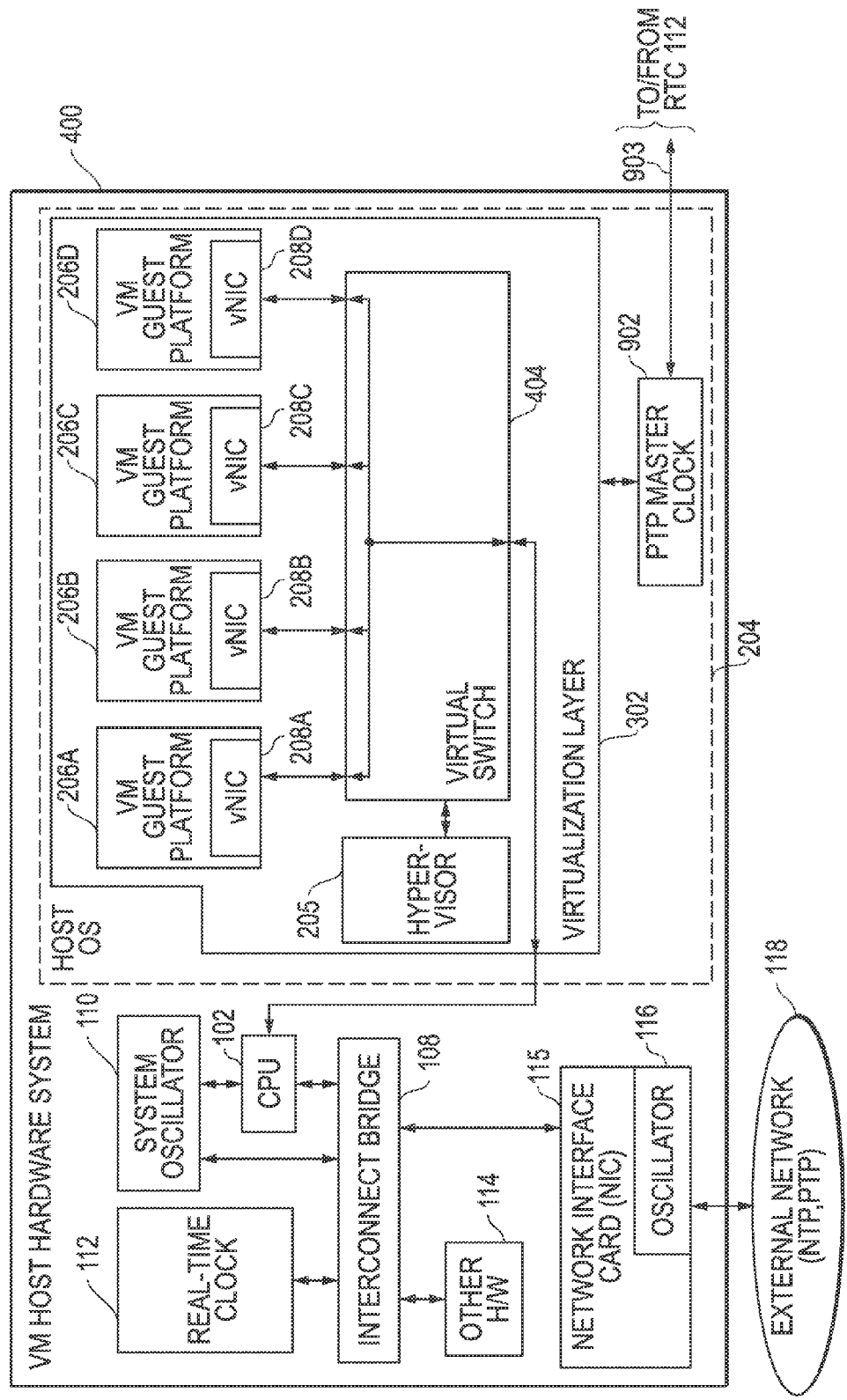

Example embodiments are now described with respect to the drawings. FIGS. 4 and 5A-E provide example embodiments that include virtual switches having transparent clocks to provide intra-switch delay information that is used for timing synchronization in VM environments. FIGS. 6A-6B provide example flow diagrams associated with the embodiments of FIGS. 4 and 5A-E. FIG. 7 provides an example embodiment of a cloud server system having multiple blade servers that include VM hardware systems with virtual switches having transparent clocks. FIG. 8 describes an example embodiment that utilizes a master clock within the virtual switch to provide a boundary clock. FIGS. 9A-B provide example embodiments that include master clocks within the VM host hardware system. Advantageously, the improved timing synchronization provided by the disclosed embodiments enable the use of applications requiring precision of timing in a VM environment Examples of such applications include video servers, monitoring appliances, gaming appliances, security appliances, surveillance appliances, industrial automation control appliances or applications, trading/financial applications, mobile services, and/or other timing sensitive applications.

Figure 4:
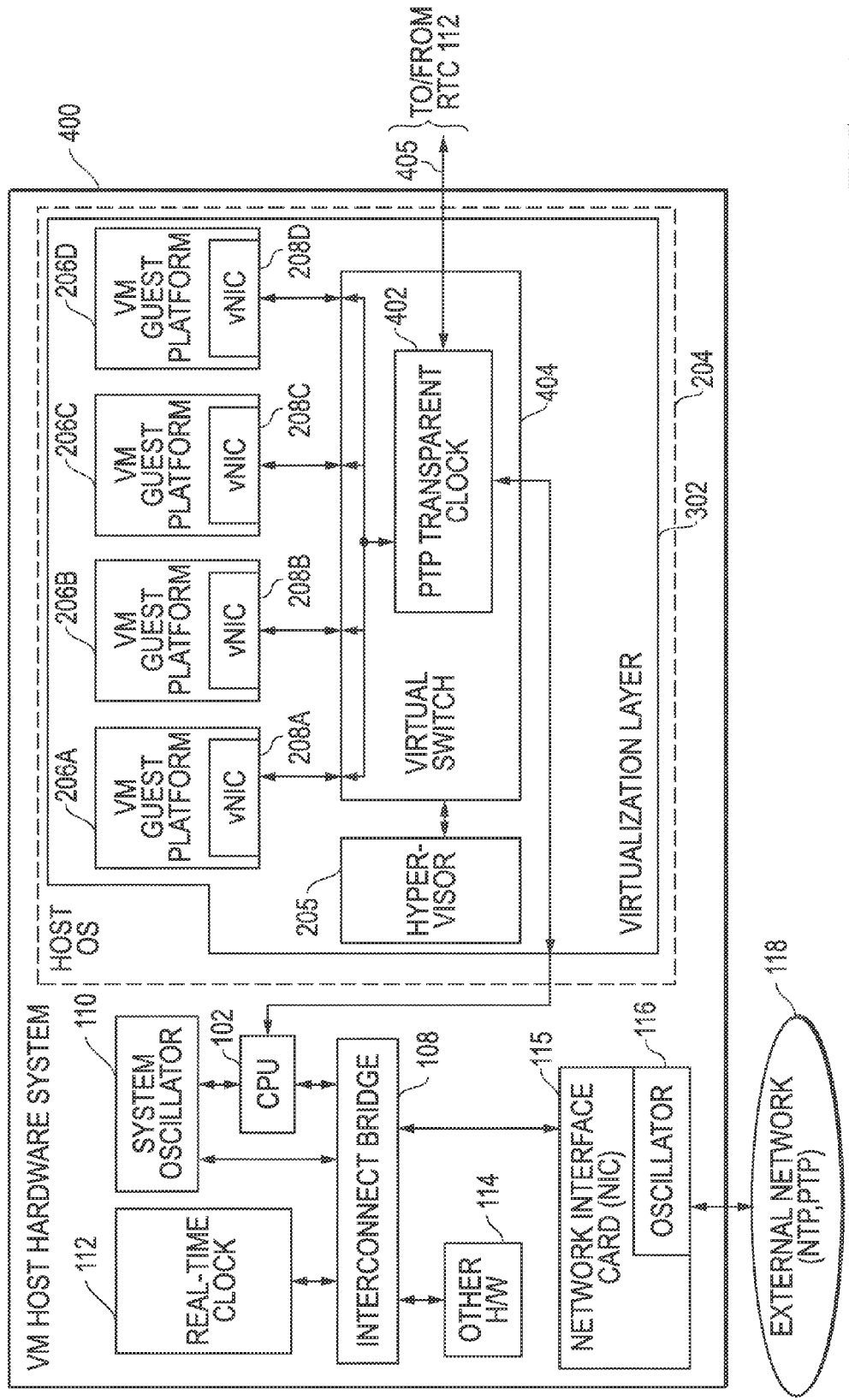
FIG. 4 is a block diagram of an example embodiment for a VM host hardware system having a PTP transparent clock configured to determine transit time corrections for network packets traversing the virtual switch.

FIG. 4 is a block diagram of an example embodiment for a virtual machine (VM) host hardware system 400 having a PTP (Precision Time Protocol) transparent clock 402 configured to determine transit time corrections for network packets traversing the virtual switch 404. By correcting time information for these network packets, this transparent clock 402 advantageously provides for significantly improved timing accuracy thereby allowing for timing sensitive applications to be hosted by the VM host hardware system 400. As described herein, by adding this transparent clock functionality to the virtual switch and determining intra-switch delay times (i.e., residence times) for packets within the virtual switch 404, the VM hardware system 400 allows for the VM guest platforms 206A, 206B, 206C, and 206D to accurately and precisely set their time. Time correction information for the detected delay of the packet associated with the residence time can be added to the packets themselves (e.g., using a correction field within the packet), can be sent in other packets, and/or can be communicated using other techniques.

Figure 3A:
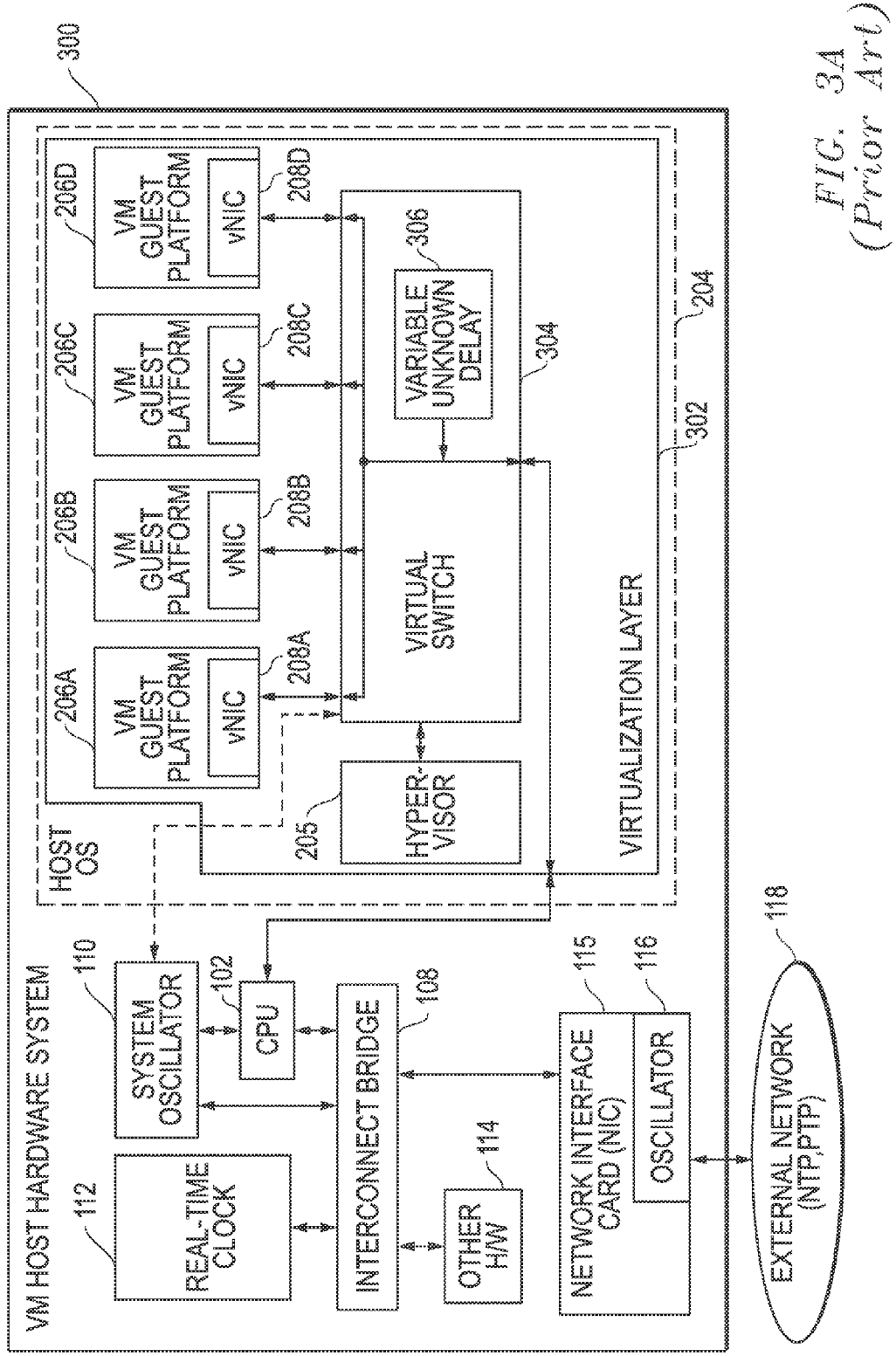
FIG. 3A (Prior Art) is a block diagram of an embodiment where a virtual switch has been included along with the hypervisor within a virtualization layer.
Figure 3B:
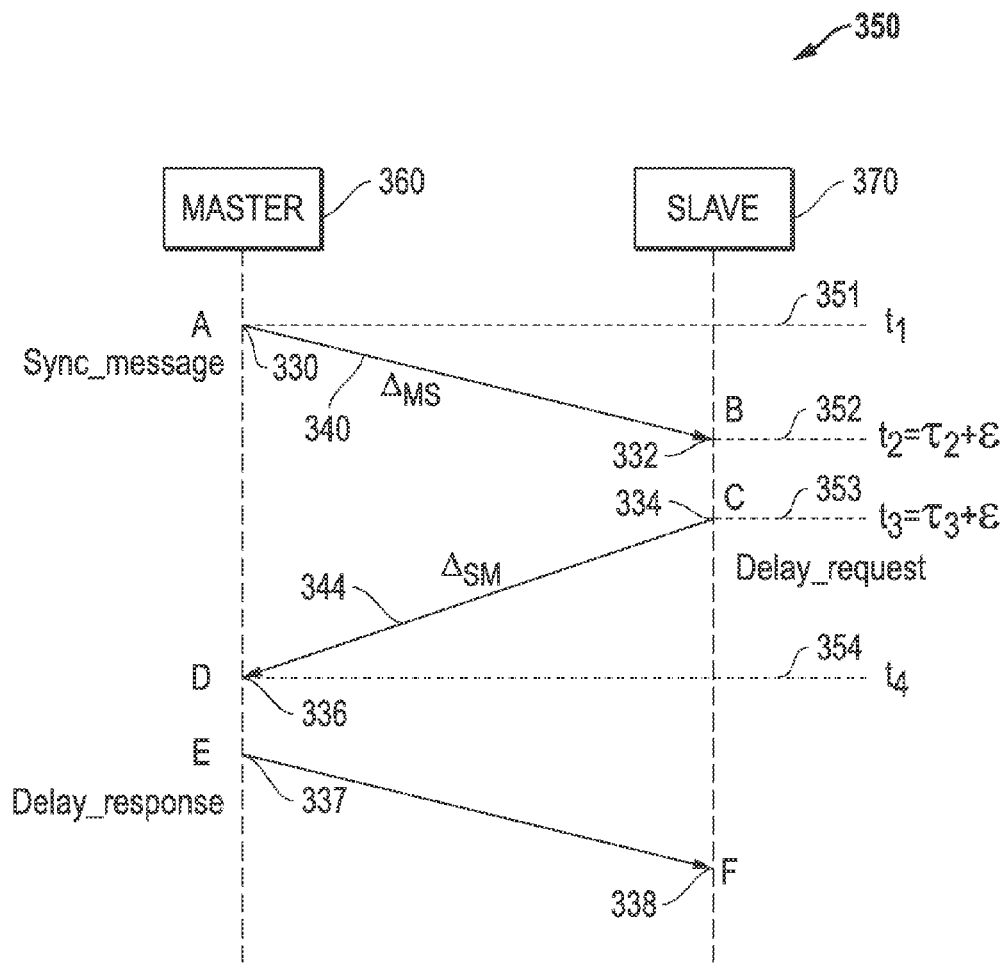
FIG. 3B (Prior Art) is a message diagram of an embodiment for master/slave messages for a timing protocol such as NTP or PTP.

In part, the VM host hardware system 400 operates in a similar fashion to embodiment 300 of FIG. 3 (Prior Art). The VM host hardware system 400 includes a central processing unit (CPU) 102 that runs a host operating system 204, a system oscillator 110, a real-time clock 112, a network interface card (NIC) 115, and other hardware (H/W) 114 coupled to communicate with the CPU 102 through an interconnect bridge 108. The NIC 115 can also include an oscillator 116, and the system oscillator 110 can also be directly connected to the CPU 102. The real-time clock 112 can be implemented using an integrated circuit including a real time clock (RTC) circuitry and non-volatile read only memory (RTC/NVRAM). The VM host hardware system 400 also includes a hypervisor 205 that executes as part of the virtualization layer 302 on top of the VM host operating system (OS) 204. This hypervisor 205 provides access to a plurality of VM platforms 206A, 206B, 206C, and 206D that emulate processing systems and related processing resources. In part, the VM platforms 206A, 206B, 206C, and 206D have virtualized network interface cards (vNICs) 208A, 208B, 208C, and 208D that are coupled to the virtual switch 404 and to the transparent clock 402 within the virtual switch 404.

As described above, one or more additional virtual hardware resources could also be associated with the VM platforms 206A, 206B, 206C, and 206D such as for example virtualized input/output (IO) interfaces, virtualized network interfaces, virtualized CPUs, virtualized storage mediums, and/or other virtualized components. The VM host hardware system 400 makes each of the VM platforms 206A, 206B, 206C, and 206D available for use by one or more network-connected guest systems. It is further noted that the VM host operating system 204, the hypervisor 205, the virtualization layer 302, the virtual switch 404, the PTP transparent clock 402, the VM guest platforms 206A, 206B, 206C, 206D, and the related virtualized hardware resources such as vNICs 208A, 208B, 208C, and 208D can be implemented, for example, as computer-readable instructions stored in a non-transitory data storage medium that are accessed and executed by one or more processing devices, such as the CPU 102, to perform the functions for the VM host hardware platform 400.

As described above, the virtual switch 404 provides virtual network packet communications among the VM platforms 206A, 206B, 206C, and 206D that are hosted as guest processes within the host operating system 204. In particular, the virtual switch 404 communicates with the virtualized NICs 208A, 208B, 208C, and 208D for the VM guest platforms 206A, 206B, 206C, and 206D to forward network packets among the VM guest platforms 206A, 206B, 206C, and 206D and between the VM guest platforms 206A, 206B, 206C, and 206D and the external network 118. As described above, the virtual switch 404 can operate using the system oscillator 110. However, with respect to embodiment 400 for FIG. 4, the virtual switch also has access to the hardware real-time clock (RTC) 112 through communication link 405. As also described herein, the transparent clock 402 allows for determination of intra-switch delays for packets traversing the virtual switch 404 and thereby allows for correction of timing information associated with the packets being communicated through the virtual switch 404.

It is again noted that the VM host hardware system 400 can be implemented, for example, using one or more processing devices such as processors and/or configurable logic devices. Processors (e.g., microcontrollers, microprocessors, central processing units, etc.) can be programmed and used to control and implement the functionality described herein, and configurable logic devices such as CPLDs (complex programmable logic devices), FPGAs (field programmable gate arrays), and/or other configurable logic devices can also be programmed to perform desired functionality.

Figure 5A:
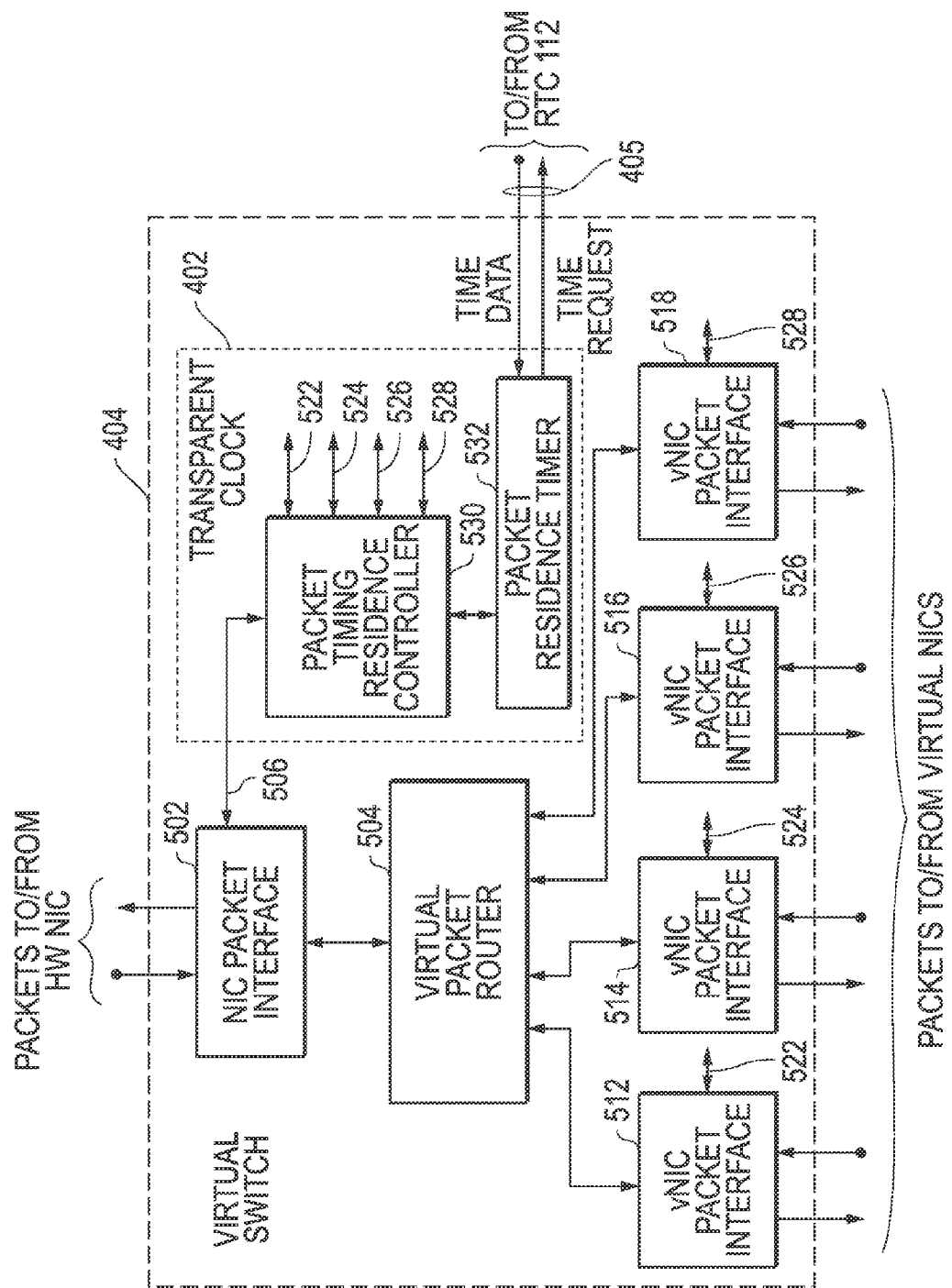
FIG. 5A is a block diagram of an example embodiment for the transparent clock of FIG. 4.

FIG. 5A is a block diagram of an example embodiment for a transparent clock 402 for a virtual switch 404. A NIC packet interface 502 sends and receives network packets to and from the hardware (HW) NIC 115. Virtual NIC (vNIC) packet interfaces 512, 514, 516, and 518 send and receive packets to and from the virtual NICs (vNICs) 208A, 208B, 208C, and 208D for the VM guest platforms 206A, 206B, 206C, and 206D. The NIC packet interface 502 and the vNIC packet interfaces 512, 514, 516, and 518 are coupled to the virtual packet router 504 that operates to route packets among these interfaces based upon the target identifiers (TIDs) within the routed packets. The transparent clock 402 includes a packet timing residence controller 530 and a packet residence timer 532. The packet residence timer 532 is configured to send time requests to the hardware RTC 112 and to receive RTC time data from the hardware RTC 112 through request/data messages communicated through communication link 405. This real-time clock information from the RTC 112 is then used by the packet residence timer 532 to determine intra-switch delay times that can be communicated to the VM guest platforms 206A, 206B, 206C, and 206D for use in timing synchronization.

In operation, when a packet is received at the NIC packet interface 502 from the hardware NIC 115, packet arrival information is communicated to the packet timing residence controller 530 through connection 506. The packet residence timer 532 then starts counting the amount of time the packet is resident within the virtual switch 404. When the packet arrives at the destination vNIC packet interface designated by the target identifier (TID) for the packet, packet departure information is communicated to the packet residence timing controller 530 through connections 522, 524, 526, or 528. A residence time value is then communicated back to the vNIC packet interface, and this residence time value is used to update a time correction field within the packet prior to its being sent out the vNIC packet interface to the target VM guest platform. The residence time value can also be communicated using other techniques, such as by adding additional fields to the packet, by adding a header with the residence time information, by sending the residence time information within an additional packet, and/or using another technique to communicate the residence time information.

Similarly, when a packet is received at a vNIC packet interface 512, 514, 516, or 518 from a vNIC for a VM guest platform, packet arrival information is communicated to the packet timing residence controller 530 through connection 522, 524, 526, or 528. The packet residence timer 532 then starts counting the amount of time the packet is resident within the virtual switch 404. When the packet arrives at the NIC packet interface 502, packet departure information is communicated to the packet residence timing controller 530 through connection 506. A residence time value is then communicated back to the NIC packet interface 502, and this residence time value is used update a time correction field within the packet prior to its being sent out the NIC packet interface to the HW NIC 115. As above, other techniques could also be used to communicate the residence time information.

It is also noted that packets received at one of the vNIC packet interface 512, 514, 516, or 518 can also be sent to one of the other vNIC packet interfaces 512, 514, 516, or 518. If this occurs, packet departure information can be communicated to the packet residence timing controller 530 through connection 522, 524, 526, or 528 when the packet arrives at the target vNIC packet interface. A residence time value is then communicated back to the vNIC packet interface, and this residence time value is used update a time correction field within the packet prior to its being sent out the vNIC packet interface to the target VM guest platform. It is again noted that other techniques could also be used to communicate the residence time information.

In operation, the residence timer 532 within the transparent clock 402 provides residence time information for packets traversing the virtual switch 404. This residence time information can then be used to adjust for packet delays associated with the virtual switch 404, thereby enabling accurate time synchronization within the VM guest platforms 206A-D for the VM host hardware system 400. The residence time timer 532 measures and determines intra-switch time delays (i.e., residence times) for traversing packets in part based upon time data received from the hardware RTC 112. As such, while the residence time being determined is for time through the virtual switch 404, the residence time measurement is based upon a real-world hardware timing signal that is generated by the hardware RTC 112 within the VM host hardware system 400. For example, it is noted that the PTP packet rate is typically 64 packets per second, and the PTP packets are sent by the PTP master clock device independent of the PTP slave device. As such, the interval between synchronization events has a nominal time of 1/64 seconds. Because the time it takes the virtual switch 404 to forward a packet is relatively small, the quantity of error that can be accumulated due to inaccuracies associated with this hardware timing signal is relatively small. For example, for a 1 millisecond (ms) residence time, an oscillator capable of providing a RTC error rate of under 100 ppm (parts per million) will provide a residence time accuracy of about 100 nanoseconds (ns). This level of accuracy far exceeds the accuracy available from a counting ticks technique applied by a virtualized CPU within a prior VM environment.

Figure 5B:
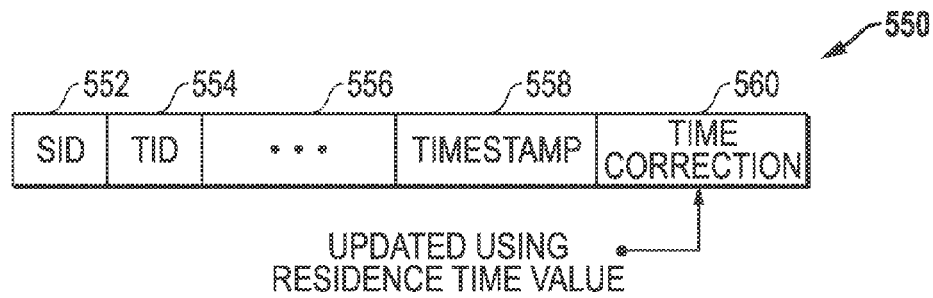
FIGS. 5B-E are diagrams of example embodiments for a network packets that can be used to communicate residence time values to provide intra-switch delay information to VM platforms.

FIG. 5B is a diagram of an example embodiment for a network packet 550 that includes a time correction field 560 that is updated using the residence time value to provide intra-switch delay information. For the embodiment shown, the network packet 550 includes a source identifier (SID) field 552, a target identifier (TID) field 554, and one or more additional fields 556, such as a data payload field and/or other fields. The network packet 550 also includes a timestamp field 558 and a time correction field 560. When a packet is communicated through the external network 118, a timestamp value is added to the timestamp field 558 to indicate the current time at the sending system. A time correction value in the time correction field 560 can be updated based upon the residence time value determined by the packet residence timer 532 to account for the intra-switch time delay associated with the packet as it traverses the virtual switch 404. It is noted that packets in some protocols include a time correction field, such as field 560, as part of the packet communication protocol.

Figure 5C:
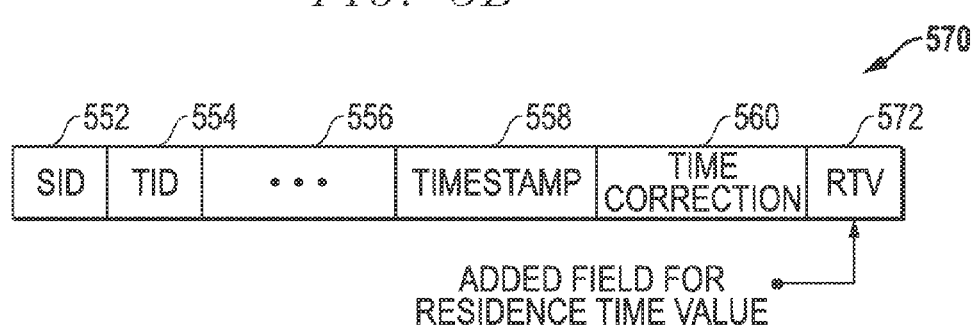

FIG. 5C is a diagram of an example embodiment for a network packet 570 that includes an additional field 572 that is added by the virtual switch 404 to provide intra-switch delay information. For the embodiment shown, the network packet 570 includes a source identifier (SID) field 552, a target identifier (TID) field 554, and one or more additional fields 556, such as a data payload field and/or other fields. The network packet 570 can also still include a timestamp field 558 and a time correction field 560, as with embodiment 550 of FIG. 5B. However, embodiment 570 also includes an additional field 572 that is used to hold the residence time value. When a packet is communicated through the external network 118, a timestamp value is added to the timestamp field 558 to indicate the current time at the sending system. For embodiment 570, the residence time value (RTV) determined by the packet residence timer 532 is also added to the new field 572 to account for the intra-switch time delay associated with the packet as it traverses the virtual switch 404.

Figure 5D:
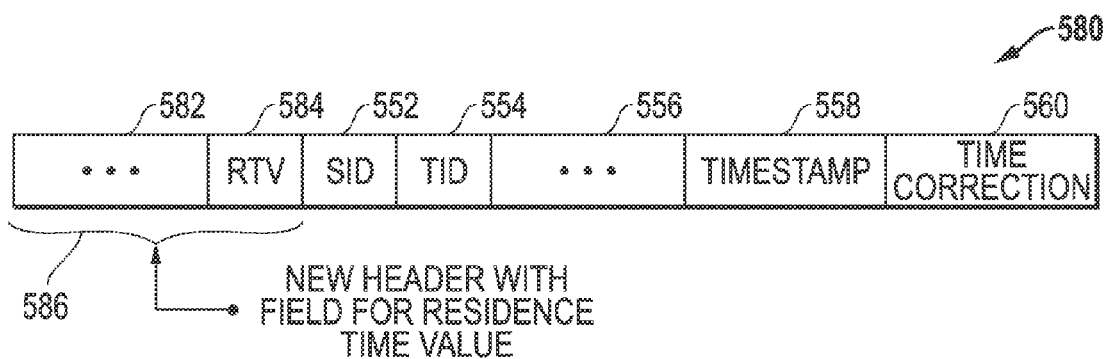

FIG. 5D is a diagram of an example embodiment for a network packet 580 that includes an additional header 586 that is added by the virtual switch 404 to provide intra-switch delay information. For the embodiment shown, the network packet 570 includes a source identifier (SID) field 552, a target identifier (TID) field 554, and one or more additional fields 556, such as a data payload field and/or other fields. The network packet 580 can also still include a timestamp field 558 and a time correction field 560, as with embodiment 550 of FIG. 5B. However, embodiment 580 also includes an additional header 586 that includes a field 584 for the residence time value along with other header fields 582. When a packet is communicated through the external network 118, a timestamp value is added to the timestamp field 558 to indicate the current time at the sending system. For embodiment 580, the residence time value (RTV) determined by the packet residence timer 532 is also added to the field 584 within the new header 586 to account for the intra-switch time delay associated with the packet as it traverses the virtual switch 404.

Figure 5E:
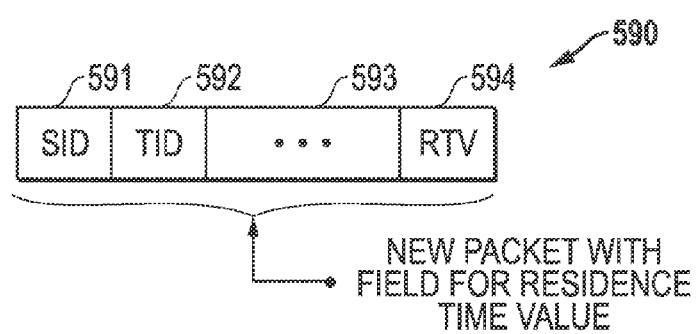

FIG. 5E is a diagram of an example embodiment for a new network packet 590 generated by the virtual switch 404 to provide intra-switch delay information. For the embodiment shown, the network packet 590 includes a source identifier (SID) field 591, a target identifier (TID) field 592, and one or more additional fields 593. The new network packet 590 also includes a field 594 for the residence time value. When a packet is communicated through the external network 118, a timestamp value is added to the timestamp field 558 to indicate the current time at the sending system. For embodiment 590, the residence time value (RTV) determined by the packet residence timer 532 is added to the field 594 within the new packet 590 to account for the intra-switch time delay associated with the packet as it traverses the virtual switch 404.

It is noted that FIGS. 5B-E provide example embodiments of techniques to communicate the intra-switch delay information from the virtual switch 404 to target destinations such as the VM platforms 206A-D. It is further noted that other communication techniques could also be used.

FIG. 6A provides a process flow diagram of an embodiment 600 for the packet residence timer 532 as a PTP packet traverses the virtual switch (vSwitch) 404 from the hardware (HW) NIC 115 to a virtual NIC (vNIC) such as virtual NIC 208A. In block 602, the PTP packet enters the hardware NIC 115. In block 606, the residence time timer 532 begins timing the amount of time the packet takes to traverse the virtual switch 404. In block 608, the virtual switch forwards the packet to the virtual NIC for the target VM guest platform, such as virtual NIC 208A for VM guest platform 206A. In block 610, the residence time timer 532 stops timing the time-of-traverse for the packet through the virtual switch 404 and then records the residence time. In block 612, the residence time is added to the current value, if any, within the correction field for the packet. In block 614, the packet enters the target virtual NIC (vNIC). As indicated by block 604, an external networking functionality can be used to determine the destination VM guest platform such as VM guest platform 206A. The external networking functionality can be, for example, ARP (Address Resolution Protocol) functionality, STP (Spanning Tree Protocol) functionality, and/or any other desired technique that provides destination address routing control for networked systems and/or virtual instances. As described above, other techniques could also be used to communicate the intra-switch delay information to target destinations.

FIG. 6B provides a process flow diagram of an embodiment 650 for the packet residence timer 532 as a PTP packet traverses the virtual switch (vSwitch) 404 from a virtual NIC (vNIC) such as virtual NIC 208A to the hardware (HW) NIC 115. In block 652, the PTP packet enters the virtual NIC (vNIC) such as virtual NIC 208A. In block 654, the residence time timer 532 begins timing the amount of time the packet takes to traverse the virtual switch 404. In block 656, the virtual switch forwards the packet to the hardware NIC 115 for the VM host hardware system 400. In block 658, the residence time timer 532 stops timing the time-of-traverse for the packet through the virtual switch 404 and then records the residence time. In block 660, the residence time is added to the current value, if any, within the correction field for the packet. In block 662, the packet enters the target hardware NIC 115. As described above, other techniques could also be used to communicate the intra-switch delay information to target destinations.

FIG. 7 is a block diagram of an embodiment 700 for a cloud server environment utilizing transparent clocks within virtual switches for blade servers 708. For the embodiment 700 depicted, a cloud server system 710 includes a plurality of blade servers 708 within a chassis 706, and each blade server 708 operates at least in part to provide a VM hardware host system 400 as described above. As such, each of these blade servers 708 is configured to provide a plurality of VM guest platforms 206 and a virtual switch 404 having a transparent clock 402. The blade servers 708 also communicate with an external network 118 such as the Internet. Further, for the embodiment 700 depicted, a separate device operates as a PTP grand master clock device 702 that receives a time reference 704 from an accurate source, such as from GPS (Global Positioning System) source, that provides an accurate reference to UTC (Coordinated Universal Time). The blade servers 708 and the VM host hardware systems 400 within the blade servers 708 can in part synchronize timing to the PTP grand master clock device 702.

In the cloud server environment of FIG. 7, therefore, numerous VM guest platforms 206 are deployed within the VM host hardware systems operating on the blade servers 708. Using the virtual switch 404 and the transparent clock 402, each of the VM guest platforms 206 within the cloud server system 710 can be accurately synchronized with each other, with systems within the external network 118, and/or to UTC through a grand master clock device 702. Using the intra-switch delay times (i.e., residence times) determined by the transparent clocks 402 to accurately synchronize packet timing, the VM host hardware systems 400 that are implemented by the blade servers 708 allow for the VM guest platforms to host timing sensitive applications. As described above, examples of such applications include video servers, monitoring appliances, gaming appliances, security appliances, surveillance appliances, industrial automation control appliances or applications, trading/financial applications, mobile services, and/or other timing sensitive applications.

FIG. 8 is a block diagram of an example embodiment for a virtual machine (VM) host hardware system 400 having a PTP boundary clock 802 configured to provide PTP master clock functionality along with slave clock functionality within the virtual switch 404. In part, the boundary clock 802 operates similar to the transparent clock 402 described above with respect to FIG. 4 with the boundary clock 802 also using a residence timer to determine intra-switch delay times for packets traversing the virtual switch and also communicating the intra-switch delay times for the traversing packets to target destinations for the traversing packets. However, where the transparent clock 402 modifies packets interchanged between master and slave clocks to add time correction information based upon residence time determinations, the boundary clock 802 both terminates packet communication connections as a PTP slave clock and also generates its own messages as a PTP master clock. As such, the boundary clock 802 is a combination of a PTP slave device and one or more PTP master devices.

As a PTP slave device, the boundary clock 802 recovers time and frequency from upstream networking devices, such as a grand master clock device within the external network 118. As a PTP master device, the boundary clock 802 generates its own PTP messages with master timestamps using this recovered time and communicates these PTP messages downstream to the VM guest platforms 206A, 206B, 206C, and 206D. Thus, while it is not required for PTP transparent clock 402 to actually synchronize its own time, boundary clock 802 has a known time base of its own that is synchronized to a master clock. Further, where no synchronization to an external grand master clock is utilized, the boundary clock 802 provides local synchronization within the virtualization layer 302 without requiring an additional external reference. As with the transparent clock 402 in FIG. 4, the boundary clock 802 is configured to send time requests to the hardware RTC 112 and to receive time data from the hardware RTC 112 through request/data messages communicated through a communication link 805.

It is noted that the VM guest platforms 206A, 206B, 206C, and 206D can operate as PTP slave devices to generate PTP slave messages with slave timestamps. For example, the virtual NICs 208A, 208B, 208C, and 208D and/or a virtualized operating system running on the VM guest platforms 206A, 206B, 206C, and 206D can operate to provide PTP slave device functionality. The boundary clock 802 then operates as the PTP master device providing PTP master messages with master timestamps to the VM guest platforms 206A, 206B, 206C, and 206D through respective master ports (M) 806. These PTP messages allow precise time synchronization to applications running in the VM guest platforms 206A, 206B, 206C, and 206D. The boundary clock 802 can also operate as a slave device with respect to a non-virtual master clock through slave (S) port 804. Further, it is noted that external devices within the external network 118 and/or non-virtual devices within the VM hardware host system 400 can also be PTP slave devices or clients with respect to the boundary clock 802 within the virtual switch 404.

FIG. 9A is a block diagram of an example embodiment for a VM host hardware system 400 having one or more PTP master clocks associated with the virtual switch 404. For the embodiment depicted, a PTP master clock module 902 is configured to run on the host operating system 204. As with the transparent clock 402 in FIG. 4 and the boundary clock 802 in FIG. 8, the PTP master clock module 902 is configured to send time requests to the hardware RTC 112 and to receive time data from the hardware RTC 112 through request/data messages communicated through a communication link 903. As such, the VM host hardware system 400 can itself operate as a PTP master clock through the module 903 running on the host operating system 204. As a PTP master clock, the module 902 generates master timing packets that are communicated to slave clocks within the VM guest platforms 206A-D, and the module 902 receives slave timing packets back from the VM guest platforms 206A-D, to the extent that the VM guest platforms 206A-D are operating using the PTP protocol for timing synchronization. The master timing packets include master time stamps determined by the master clock, and the slave timing packets include slave timestamps determined by the slave clock Other variations and combinations could also implemented to provide a PTP master clock within the VM host hardware system 204 that can be used within the virtualization layer 204 for timing synchronization.

FIG. 9B is a block diagram of an example embodiment for a VM host hardware system 400 having one or more PTP master clocks associated with the virtual switch 404. For the embodiment depicted, one of the VM guest platforms 904 is configured to operate as a PTP master clock. As with the transparent clock 402 in FIG. 4 and the boundary clock 802 in FIG. 8, the VM master clock 904 is configured to send time requests to the hardware RTC 112 and to receive time data from the hardware RTC 112 through request/data messages communicated through a communication link 905. As such, the VM host hardware system 400 can itself operate as a PTP master clock through one or more of the VM guest platforms, such as VM guest platform 904, being configured to operate as PTP master clock. As a PTP master clock, the VM guest platform 904 generates master timing packets that are communicated to slave clocks within the other VM guest platforms 206A-C, and the VM guest platform 904 receives slave timing packets back from the other VM guest platforms 206A-C, to the extent that the other VM guest platforms 206A-C are operating using the PTP protocol for timing synchronization. The master timing packets include master time stamps determined by the master clock, and the slave timing packets include slave timestamps determined by the slave clock Other variations and combinations could also implemented to provide a PTP master clock within the VM host hardware system 204 that can be used within the virtualization layer 204 for timing synchronization.

It is noted that the operational and functional blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA, CPLD, ASIC, or other suitable processing device or combination of such processing devices.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method to synchronize timing in a virtual machine host system, comprising:
    generating real-time clock information using a real-time clock within a virtual machine (VM) host system;
    operating one or more processing devices within the VM host system to provide at least one virtual machine (VM) platform within a virtualization layer for the VM host system;
    generating master timing packets using a master clock within the VM host system, the master clock receiving the real-time clock information from the real-time clock;
    generating slave timing packets using a slave clock within the at least one VM platform;
    communicating the master timing packets from the master clock to the slave clock and the slave timing packets from the slave clock to the master clock;
    synchronizing timing within the at least one VM platform using the timing packets;
    forwarding packets between a network interface for the VM host system and one or more virtual network interfaces for the at least one VM platform using a virtual switch within the virtualization layer, and forwarding the master and slave timing packets using the virtual switch within the virtualization layer;
    operating a transparent clock within the virtual switch to receive real-time clock information from the real-time clock and to determine intra-switch delay times for the master and slave timing packets traversing the virtual switch using the real-time clock information and communicating the intra-switch delay times to the at least one VM platform; and
    communicating the intra-switch delay times by at least one of modifying time correction fields within the timing packets using the intra-switch delay times, adding data to the timing packets using the intra-switch delay times, encapsulating the timing packets with headers having the intra-switch delay times, or forming additional packets with the intra-switch delay times.

2. The method of claim 1, further comprising utilizing the timing packets and the intra-switch delay times within the at least on VM platform for timing synchronization.

3. The method of claim 1, further comprising generating master timing packets and slave timing packets within the virtual switch in combination with the transparent clock to form a boundary clock within the virtual switch.

4. The method of claim 1, further comprising providing the master clock within at least one VM platform within the virtualization layer.

5. The method of claim 1, further comprising providing the master clock within an operating system for the VM host system apart from the virtualization layer.

6. The method of claim 1, further comprising receiving UTC (Coordinated Universal Time) time information within the VM host system and using the UTC time information to generate the real-time clock information for the real-time clock.

7. A virtual machine (VM) host system having timing synchronization, comprising:
- a real-time clock having real-time clock information as an output;
- a network interface configured to receive packets from an external network;
- a master clock coupled to receive real-time clock information from the real-time clock and configured to generate master timing packets using the real-time clock information;
- one or more processing devices configured to provide a virtualization layer comprising at least one virtual machine (VM) platform configured to receive the master timing packets, to generate slave timing packets using a slave clock, to send the slave timing packets to the master clock, and to synchronize timing within the at least one VM platform using the timing packets;
- a virtual switch within the virtualization layer configured to forward packets between the network interface and one or more virtual network interfaces for the at least one VM platform and to forward the master timing packets and the slave timing packets; and
- a transparent clock within the virtual switch configured to receive real-time clock information from the real-time clock, to determine intra-switch delay times for the timing packets traversing the virtual switch based upon the real-time clock information, and to communicate the intra-switch delay times to the at least one VM platform;
- wherein the virtual switch is configured to communicate the intra-switch delay times as modifications to time correction fields within the timing packets, as additional data within the timing packets, within encapsulation headers for the timing packets, or within additional packets including the intra-switch delay times.

8. The VM host system of claim 7, wherein the at least one VM platform is further configured to utilize the timing packets and the intra-switch delay times for timing synchronization.

9. The VM host system of claim 7, further comprising a master clock and one or more slave clocks within the virtual switch in combination with the transparent clock to form a boundary clock within the virtual switch.

10. The VM host system of claim 7, wherein the master clock is formed within at least one VM platform within the virtualization layer.

11. The VM host system of claim 7, wherein the master clock is formed within an operating system for the VM host system apart from the virtualization layer.

12. The VM host system of claim 7, wherein the virtual switch comprises a packet interface configured to communicate with the network interface, a virtual packet router, and one or more packet interfaces configured to communicate with the one or more virtual network interfaces for the at least one VM platform.

13. The VM host system of claim 12, wherein the transparent clock is coupled to the packet interface for the virtual switch and comprises a residence timer configured to generate the intra-switch delay times for packets received at the packet interfaces.

14. The VM host system of claim 13, wherein the packet residence timer is configured to send time requests to the real-time clock and to receive the real-time clock information from the real-time clock based upon the time requests.

15. A virtual machine (VM) host system having timing synchronization, comprising:
- a real-time clock having real-time clock information as an output;
- a network interface configured to receive packets from an external network;
- a master clock coupled to receive real-time clock information from the real-time clock and configured to generate master timing packets using the real-time clock information;
- one or more processing devices configured to provide a virtualization layer comprising at least one virtual machine (VM) platform configured to receive the master timing packets, to generate slave timing packets using a slave clock, to send the slave timing packets to the master clock, and to synchronize timing within the at least one VM platform using the timing packets;
- a virtual switch within the virtualization layer configured to forward packets between the network interface and one or more virtual network interfaces for the at least one VM platform and to forward the master timing packets and the slave timing packets; and
- a transparent clock within the virtual switch configured to receive real-time clock information from the real-time clock, to determine intra-switch delay times for the timing packets traversing the virtual switch based upon the real-time clock information, and to communicate the intra-switch delay times to the at least one VM platform;
- wherein the virtual switch comprises a packet interface configured to communicate with the network interface, a virtual packet router, and one or more packet interfaces configured to communicate with the one or more virtual network interfaces for the at least one VM platform.

16. The VM host system of claim 15, wherein the transparent clock is coupled to the packet interface for the virtual switch and comprises a residence timer configured to generate the intra-switch delay times for packets received at the packet interfaces.

17. The VM host system of claim 16, wherein the packet residence timer is configured to send time requests to the real-time clock and to receive the real-time clock information from the real-time clock based upon the time requests.

* * * * *